US012665708B2

(12) United States Patent
Kadan et al.

(10) Patent No.: US 12,665,708 B2
(45) Date of Patent: Jun. 23, 2026

(54) PRECODER FOR JOINT COMMUNICATION AND SENSING

(71) Applicant: VIAVI Solutions Inc., Chandler, AZ (US)

(72) Inventors: Fehmi Emre Kadan, London (GB); Onur Dizdar, London (GB); Stephen Wang, London (GB)

(73) Assignee: VIAVI Solutions Inc., Chandler, AZ (US)

( * ) Notice: Subject to any disclaimer, the term of this patent is extended or adjusted under 35 U.S.C. 154(b) by 321 days.

(21) Appl. No.: 18/416,225

(22) Filed: Jan. 18, 2024

(65) Prior Publication Data
US 2025/0240125 A1      Jul. 24, 2025

(51) Int. Cl.
H04L 1/20        (2006.01)
H04L 1/00        (2006.01)

(52) U.S. Cl.
CPC ............ H04L 1/203 (2013.01); H04L 1/0009 (2013.01); H04L 1/0026 (2013.01)

(58) Field of Classification Search
None
See application file for complete search history.

(56) References Cited

U.S. PATENT DOCUMENTS

| | | | | |
|---|---|---|---|---|
| 10,637,544 | B1 * | 4/2020 | Shattil .................. | H04B 7/0691 |
| 2023/0268960 | A1 * | 8/2023 | Feng ...................... | H04B 7/024 |
| | | | | 370/329 |

| | | | | |
|---|---|---|---|---|
| 2023/0421215 | A1 * | 12/2023 | Duan ................... | H04B 7/0417 |
| 2024/0106509 | A1 * | 3/2024 | Yao ........................ | H04L 1/0003 |
| 2024/0134003 | A1 * | 4/2024 | Guo ........................ | G01S 13/42 |
| 2024/0195462 | A1 * | 6/2024 | You ................... | H04B 7/18513 |
| 2024/0205700 | A1 * | 6/2024 | Yu ........................ | H04L 5/0062 |
| 2025/0096881 | A1 * | 3/2025 | Ren ...................... | H04B 7/0848 |

OTHER PUBLICATIONS

Cong, D., et al., "Beamforming Design for Integrated Sensing and Communication Systems with Finite Alphabet Input", IEEE Wireless Communications Letters, IEEE, Piscataway, NJ, USA, vol. 11(10), Aug. 3, 2022, pp. 2190-2194.

(Continued)

*Primary Examiner* — Clemence S Han
(74) *Attorney, Agent, or Firm* — Harrity & Harrity, LLP

(57)        ABSTRACT

In some implementations, a device may obtain information associated with one or more targets, wherein the information associated with the one or more targets includes sensing information and a communication performance control parameter. The device may determine a sensing beampattern based at least in part on the information associated with the one or more targets. The device may determine a target sensing autocorrelation matrix for the sensing beampattern. The device may identify a candidate sensing autocorrelation matrix for a joint communication and sensing transmission based at least in part on the target sensing autocorrelation matrix. The device may determine a target sensing precoder based at least in part on the candidate sensing autocorrelation matrix. The device may generate a joint communication and sensing precoder based at least in part on the target sensing precoder and the communication performance control parameter.

20 Claims, 11 Drawing Sheets

100 ➔

JCAS Tx and sensing Rx

Target 2

UE 1

Target 1

UE 2

102 ➔

JCAS Tx

Target 2

UE 1

Target 1

UE 2

Sensing Rx

Communication beam

Sensing beam

(56) References Cited

OTHER PUBLICATIONS

Extended European Search Report for European Application No. EP251504874 dated Jun. 2, 2025, 7 pages.

T. Wild, V. Braun and H. Viswanathan, "Joint Design of Communication and Sensing for Beyond 5G and 6G Systems," in IEEE Access, vol. 9, pp. 30845-30857, 2021.

3rd Generation Partnership Project (3GPP), "Rel-19 Channel Modeling for ISAC and New Spectrum (7-24GHz) (RAN1-led)," Discussion Document RP-231798, Sep. 11-15, 2023.

F. Liu, L. Zhou, C. Masouros, A. Li, W. Luo, and A. Petropulu, "Toward dual-functional radar-communication systems: Optimal waveform design," IEEE Transactions on Signal Processing, vol. 66, No. 16, pp. 4264-4279, 2018.

T. Xu, F. Liu, C. Masouros, and I. Darwazeh, "An experimental proof of concept for integrated sensing and communications waveform design," IEEE Open Journal of the Communications Society, vol. 3, pp. 1643-1655, 2022.

D. R. Fuhrmann and G. San Antonio, "Transmit beamforming for MIMO radar systems using signal cross-correlation," IEEE Transactions on Aerospace and Electronic Systems, vol. 44, No. 1, pp. 171-186, 2008.

Wang, S., Dai, W., Wang, H., & Li, G. Y. (2023). Robust Waveform Design for Integrated Sensing and Communication. arXiv preprint arXiv:2311.00071.

J. A. Zhang et al., "Enabling Joint Communication and Radar Sensing in Mobile Networks—A Survey," in IEEE Communications Surveys & Tutorials, vol. 24, No. 1, pp. 306-345, Firstquarter 2022.

M. S. Sim, M. Chung, D. Kim, J. Chung, D. K. Kim and C.-B. Chae, "Nonlinear Self-Interference Cancellation for Full-Duplex Radios: From Link-Level and System-Level Performance Perspectives," in IEEE Communications Magazine, vol. 55, No. 9, pp. 158-167, Sep. 2017.

B. Yu and C. Qian, "Full Duplex Communication with Practical Self-Interference Cancellation Implementation", https://research.samsung.com/blog/Full-Duplex-Communication-with-Practical-Self-Interference-Cancellation-Implementation, 2022.

Bayraktar, Murat, Nuria González-Prelcic, and Hao Chen. "Hybrid Precoding and Combining for mmWave Full-Duplex Joint Radar and Communication Systems under Self-Interference." arXiv preprint arXiv:2311.14942 (2023).

* cited by examiner

118

128

SAZF, Perfect CSI
SAZF, Imperfect CSI
Robust SAZF, Imperfect CSI

UE-1 Channel:
Angles = -15°, -25°, -35°,
Gains = 0, -5, -10 dB

UE-2 Channel:
Angles = 40°, 20°, 50°,
Gains = 0, -5, -10 dB

Target Angle:
Uniform in [-5°, 5°]

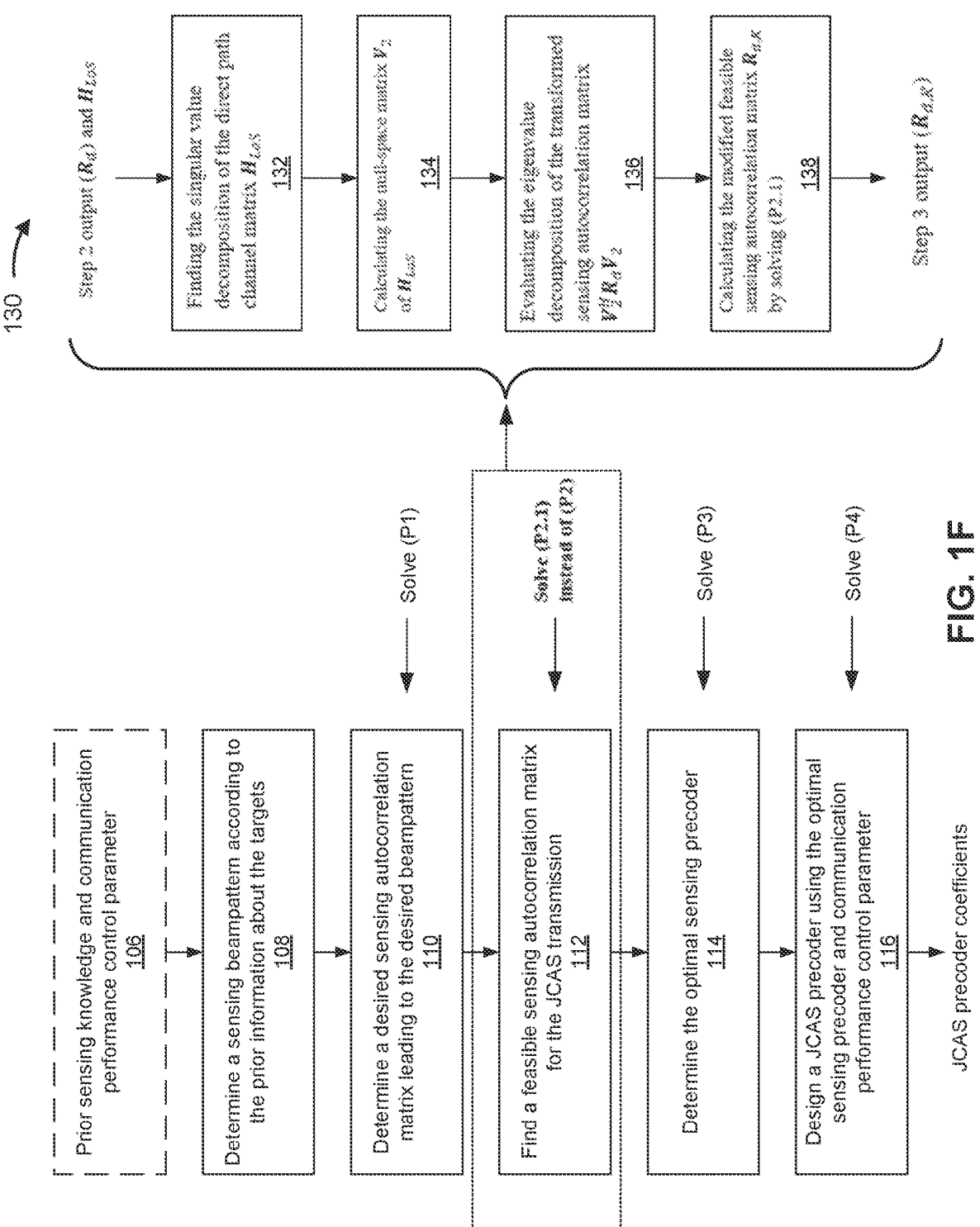

130

Step 2 output ($R_d$) and $H_{LoS}$

Finding the singular value decomposition of the direct path channel matrix $H_{LoS}$  132

Calculating the null-space matrix $V_2$ of $H_{LoS}$  134

Evaluating the eigenvalue decomposition of the transformed sensing autocorrelation matrix $V_2^H R_d V_2$  136

Calculating the modified feasible sensing autocorrelation matrix $R_{d,K}$ by solving (P2.1)  138

Step 3 output ($R_{d,K}$)

Solve (P1)

Solve (P2.1) instead of (P2)

Solve (P3)

Solve (P4)

FIG. 1F

Prior sensing knowledge and communication performance control parameter  106

Determine a sensing beampattern according to the prior information about the targets  108

Determine a desired sensing autocorrelation matrix leading to the desired beampattern  110

Find a feasible sensing autocorrelation matrix for the JCAS transmission  112

Determine the optimal sensing precoder  114

Design a JCAS precoder using the optimal sensing precoder and communication performance control parameter  116

JCAS precoder coefficients

140

With direct path cancellation
Without direct path cancellation

Target Angle:
Uniform in [-5°, 5°]

Direct path at 12°

200

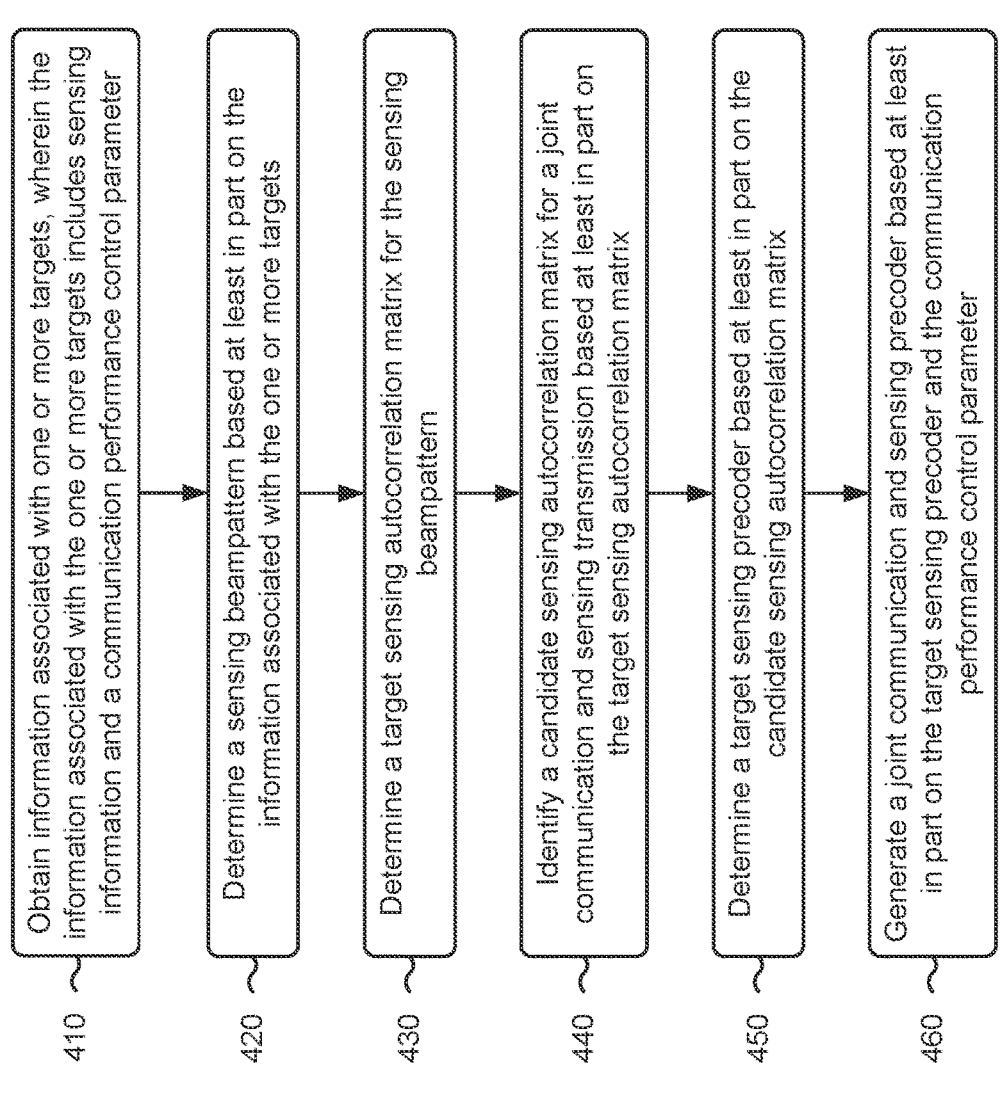

400

410 — Obtain information associated with one or more targets, wherein the information associated with the one or more targets includes sensing information and a communication performance control parameter 420 — Determine a sensing beampattern based at least in part on the information associated with the one or more targets 430 — Determine a target sensing autocorrelation matrix for the sensing beampattern 440 — Identify a candidate sensing autocorrelation matrix for a joint communication and sensing transmission based at least in part on the target sensing autocorrelation matrix 450 — Determine a target sensing precoder based at least in part on the candidate sensing autocorrelation matrix 460 — Generate a joint communication and sensing precoder based at least in part on the target sensing precoder and the communication performance control parameter

FIG. 4

PRECODER FOR JOINT COMMUNICATION AND SENSING

BACKGROUND

Joint communication and sensing (JCAS) is a technology that integrates communication and sensing into a single system. A JCAS system may leverage hardware and signal processing techniques of communication systems to perform sensing tasks while maintaining communication functionalities. This integration may allow for efficient use of the electromagnetic spectrum, reducing the need for separate systems for performing communication and sensing. JCAS may enhance capabilities of systems in complex scenarios, such as urban environments and crowded spaces, where traditional sensing and communication systems may encounter challenges.

SUMMARY

In some implementations, a method includes obtaining information associated with one or more targets, wherein the information associated with the one or more targets includes sensing information and a communication performance control parameter; determining a sensing beampattern based at least in part on the information associated with the one or more targets; determining a target sensing autocorrelation matrix for the sensing beampattern; identifying a candidate sensing autocorrelation matrix for a joint communication and sensing transmission based at least in part on the target sensing autocorrelation matrix; determining a target sensing precoder based at least in part on the candidate sensing autocorrelation matrix; and generating a joint communication and sensing precoder based at least in part on the target sensing precoder and the communication performance control parameter.

In some implementations, a device includes one or more memories; and one or more processors, coupled to the one or more memories, configured to: obtain information associated with one or more targets, wherein the information associated with the one or more targets includes sensing information and a communication performance control parameter; determine a sensing beampattern based at least in part on the information associated with the one or more targets; determine a target sensing autocorrelation matrix for the sensing beampattern; identify a candidate sensing autocorrelation matrix for a joint communication and sensing transmission based at least in part on the target sensing autocorrelation matrix; determine a target sensing precoder based at least in part on the candidate sensing autocorrelation matrix; and generate a joint communication and sensing precoder based at least in part on the target sensing precoder and the communication performance control parameter.

In some implementations, a non-transitory computer-readable medium storing a set of instructions includes one or more instructions that, when executed by one or more processors of a device, cause the device to: obtain information associated with one or more targets, wherein the information associated with the one or more targets includes sensing information and a communication performance control parameter; determine a sensing beampattern based at least in part on the information associated with the one or more targets; determine a target sensing autocorrelation matrix for the sensing beampattern; identify a candidate sensing autocorrelation matrix for a joint communication and sensing transmission based at least in part on the target sensing autocorrelation matrix; determine a target sensing precoder based at least in part on the candidate sensing autocorrelation matrix; and generate a joint communication and sensing precoder based at least in part on the target sensing precoder and the communication performance control parameter.

BRIEF DESCRIPTION OF THE DRAWINGS

FIGS. 1A-1H are diagrams illustrating examples of precoders for joint communication and sensing.

FIG. 4 is a flowchart of an example process associated with precoders for joint communication and sensing.

DETAILED DESCRIPTION

Figure 1A:
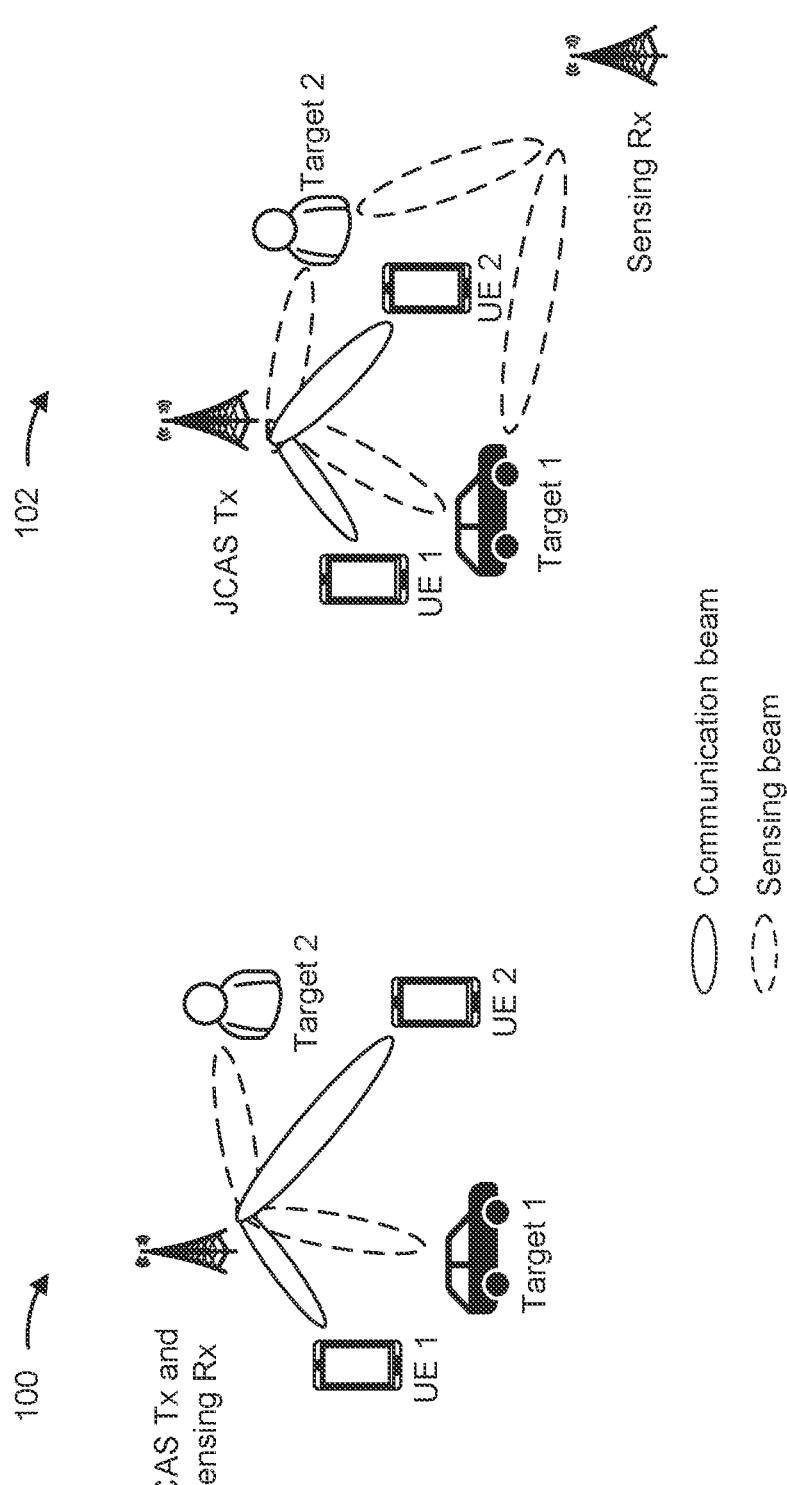

The following detailed description of example implementations refers to the accompanying drawings. The same reference numbers in different drawings may identify the same or similar elements.

Joint communications and sensing (JCAS) is a technology where sensing functionality is added to communication networks to enable new use-cases such as traffic monitoring, identification of parking spots in busy city streets, around the corner vehicle detection, detecting pedestrians crossing streets, counting the number of people within a local area, detection of unidentified drones or other flying objects, detection of humidity levels for agricultural applications, detecting the presence of people within geo-fenced areas of a factory, accurate localization and tracking of large passive objects in a factory, collision avoidance between autonomous guided vehicles or other mobile robots and people, and estimating the height of stacked pallets or containers in a warehouse, among other examples.

A JCAS transmitter (Tx) and sensing receiver (Rx) may be at a same location in a mono-static mode, which may allow for rapid and easy information exchange between the JCAS Tx and sensing Rx. However, there may be self-interference (SI) between the two nodes due to signal coupling from the JCAS Tx to the sensing Rx as they operate using the same time and frequency resources. In contrast, a bi-static mode may not suffer from self-interference, but instantaneous information exchange may not be possible between the JCAS Tx and sensing Rx, for example, since they are located separately. To use the available resources efficiently, a precoding design may be used to manage the communications and sensing performance jointly. In some cases, a trade-off parameter may be used in the precoding design to adjust the communication and sensing performance flexibly. However, to find a balance between the communications and sensing performance, it may be difficult to provide a guaranteed communications or sensing performance as the trade-off parameter used may have a complex dependence on other network parameters. Various aspects are described herein for a novel, low-complexity precoding technique with a closed-form solution that provides a fully controllable communication performance. The aspects described herein may allow some signal-to-interference-and-noise ratio (SINR) loss for each communication user equipment (UE), and may optimize the sensing performance accordingly.

In some examples, a JCAS Tx may have ideal channel state information (CSI). However, there may be some estimation errors caused by thermal noise, external interference, or hardware impairments at the receiver, among other examples. These may be referred to as Type-1 channel estimation errors. Additionally, or alternatively, there may be some estimation errors caused by quantization errors in practical systems. These may be referred to as Type-2 channel estimation errors. There are two cases of channel estimation modes in current communications systems. Case 1 refers to reciprocity-based operation in a time-division duplex (TDD) mode where the downlink channels are estimated via uplink pilot symbols. Case 2 refers to channel estimation operation in the UE side in TDD or frequency-division-duplex (FDD) mode where the estimated coefficients are quantized and fed back to the base station. In general, Case 2 mode includes both type-1 errors and type-2 errors, whereas Case 1 includes only type-1 errors. Type-1 errors can be statistically modelled using additive white Gaussian noise errors, whereas type-2 errors are modelled as norm-bounded errors where the maximum error amount depends on the selected quantization points. Due to channel estimation errors, the communication performance may decrease, and robust algorithms may be required to decrease the effects of the channel estimation errors. Various aspects are described herein for a precoder design using sensing-aware zero forcing (SAZF) that provides robustness against both type-1 and type-2 channel estimation errors in both case 1 and case 2 and under both sensing methods (mono-static and bi-static).

In some examples, a direct signal path between JCAS Tx and sensing Rx may be eliminated either by Tx or Rx operations, for example, since the direct signal path does not include any useful information about the targets to be sensed. This may be true in both gNB mono-static and gNB bi-static cases. In the first scenario, the direct path may cause strong self-interference as both JCAS Tx and sensing Rx may be closely located and may be operating using the same time and frequency resource block. The received signal power of the reflected signal coming from the nearby objects may be significantly lower than that of the self-interference power. This may also result in saturation of analog-to-digital converters of sensing Rx. To realize the gNB mono-static JCAS, a self-interference may need to be suppressed. For a gNB bi-static scenario, by means of sufficient spatial separation between JCAS Tx and sensing Rx, a strong direct signal component may not be expected. Nevertheless, this line-of-sight component may have more power than the signal components reflecting from the targets. When there is not any direct connection via another dedicated link (wired or wireless) between JCAS Tx and sensing Rx nodes, the wireless direct link between JCAS Tx and sensing Rx can be used to extract some information. On the other hand, considering current network abilities, it may be possible to connect JCAS Tx and sensing Rx to a higher-level network entity (such as a core network) so that some information exchange becomes possible. When there is such a connection, as the direct path does not include any information about the surrounding targets, it may be eliminated again, either at the sensing Rx or JCAS Tx, to improve performance.

For gNB mono-static scenarios, a common assumption is that by means of analog or digital cancellation techniques, it may be possible to suppress the self-interference sufficiently so that it does not affect the sensing performance. On the other hand, analog or digital cancellation without any multiple-input multiple-output (MIMO) processing may not be sufficient for JCAS systems, as these systems may have potentially larger transmit power compared to traditional communication transmitters to sense passive objects. In some cases, to suppress the self-interference to a noise level (−90 dBm) in a full-duplex communication system with 23 dBm Tx power, 113 dB suppression is required. Considering that a mono-static JCAS system may experience two-way path-loss (for example, the signal transmitted by JCAS Tx may first reach to a target and may be reflected back to sensing Rx), higher Tx power may be required for sensing, resulting in a higher SI suppression necessity. For gNB bi-static scenarios, it may be possible to operate sensing algorithms at the sensing Rx node when the direct path between JCAS Tx and sensing Rx exists. When there is a dedicated connection between JCAS Tx and sensing Rx, the direct path can be calculated (for example, an angle-of-arrival (AoA) as well as delay and Doppler values) and, thus, it may be possible to either cancel the related path at the sensing Rx or discard the information (AoA, delay, Doppler) for that path. However, the performance may degrade due to unnecessary power leakage toward the direct path between the JCAS Tx and sensing Rx, a decreased degree of freedom at the sensing Rx, and/or decreased resolution around the direct path angles. As a result, in gNB bi-static scenarios with some level of information exchange between JCAS Tx and sensing Rx, the wireless direct link between JCAS Tx and sensing Rx may need to be cancelled to improve performance. Various aspects are described herein for an array signal processing algorithm for increasing SI suppression capability in a gNB mono-static system and/or suppressing the useless wireless direct path between JCAS Tx and sensing Rx in a gNB bi-static system. The aspects may allow some level of suppression by modifying JCAS Tx precoder with the direct path channel information. This suppression capability may help the JCAS system to have an SI signal level that is close to the noise power level in gNB mono-static mode and/or to have a less dominant direct path between the JCAS Tx and sensing Rx in gNB bi-static mode.

FIGS. 1A-1H are diagrams illustrating examples of precoders for joint communication and sensing.

As shown in FIG. 1A and example 100, in a mono-static mode, a JCAS Tx and sensing Rx are at the same location, which may allow for rapid and easy information exchange between the JCAS Tx and sensing Rx. For example, a JCAS Tx and sensing Rx may communicate with UE 1 and UE 2 using communication beams and may sense Target 1 and Target 2 using sensing beams. In some cases, this may result in self-interference between the two nodes, for example, due to signal coupling from JCAS Tx to sensing Rx as they operate using the same time and frequency resources. In contrast, as shown in FIG. 1A and example 102, a JCAS Tx may communicate with UE 1 and UE 2 using communication beams and may sense Target 1 and Target 2 using sensing beams. Additionally, a sensing Rx may sense Target 1 and Target 2 using sensing beams. The bi-static mode may not suffer from self-interference. However, instantaneous information exchange may not be possible between JCAS Tx and sensing Rx, for example, since the JCAS Tx and sensing Rx are located separately.

Figure 1B:
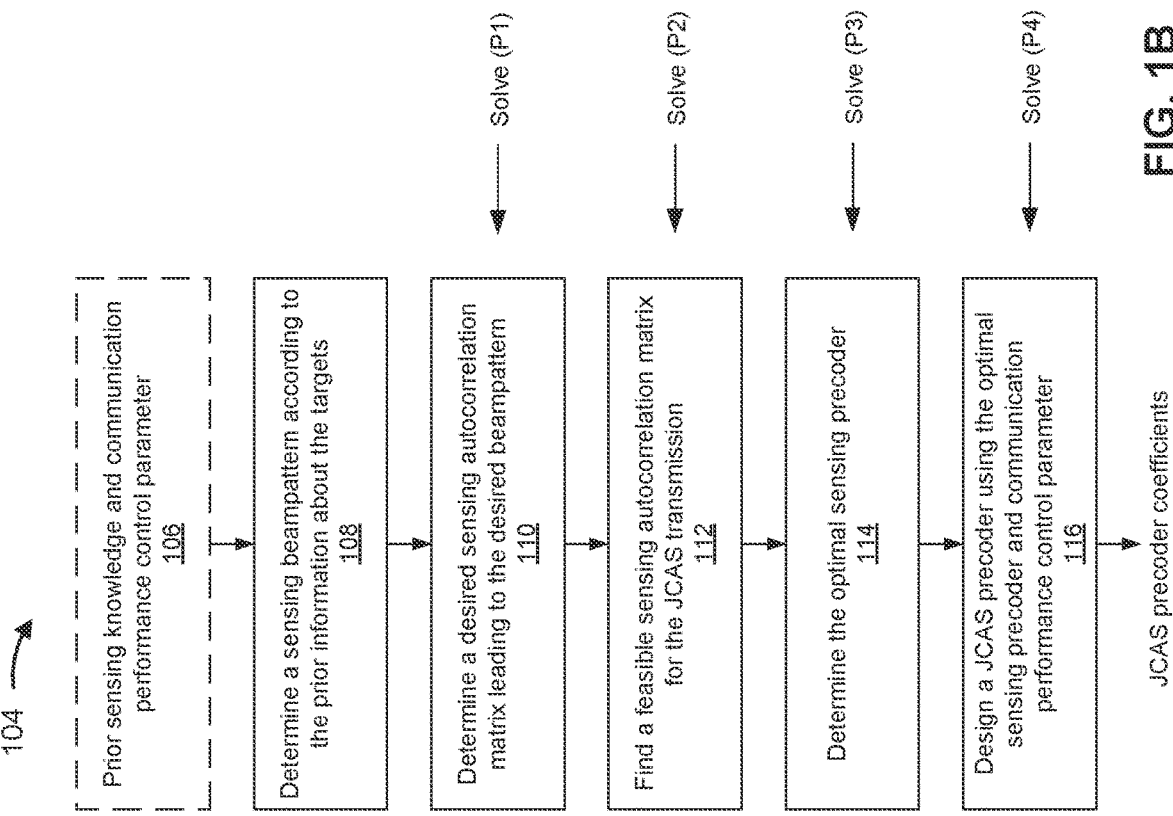

As shown in FIG. 1B and example 104, a JCAS precoder may be designed. As shown by reference number 106, a JCAS device may obtain prior sensing knowledge and may obtain a communication performance control parameter. As shown by reference number 108, the JCAS device may determine a sensing beampattern according to the prior information about the targets. As shown by reference number 110, the JCAS device may determine a desired sensing autocorrelation matrix leading to the desired beampattern. As shown by reference number 112, the JCAS device may find a feasible sensing autocorrelation matrix for the JCAS transmission. As shown by reference number 114, the JCAS device may determine the optimal sensing precoder. As shown by reference number 116, the JCAS device may design a JCAS precoder using the optimal sensing precoder and the communication performance control parameter. Additional details are described below.

In some aspects, a JCAS system (mono-static or bi-static) may be designed where the downlink communication data signal is used also for sensing purposes. A dedicated sensing Rx that is separate from the JCAS Tx may be used to perform sensing operations (such as object detection, angle-of-arrival estimation, or distance/velocity estimation of targets, among other examples). The location of the sensing Rx can be near (mono-static) or far away (bi-static) from the JCAS. In some cases, there may be a dedicated connection (either cabled or wireless) between the JCAS Tx and sensing Rx for information exchange. In some cases, the JCAS Tx and sensing Rx may have the same number of antennas (N) with the same array geometry. Matrices and vectors described herein are denoted by uppercase and lowercase letters, $\text{tr}(\cdot)$, $\mathbb{E}[\cdot]$, $\|\cdot\|$, $(\cdot)^\dagger$ are trace, expectation, Frobenius ($\ell_2$) norm, and pseudoinverse operators, respectively. $\mathbb{C}$, $\mathbb{R}$ denote the sets of complex and real numbers, respectively. $[A]_{i,j}$ denotes the entry at the i-th row and the j-th column of the matrix A, exp(A) denotes the matrix satisfying $[\exp(A)]_{i,j}=e^{[A]_{i,j}}$ for all entries. $A \succeq 0$ shows that the matrix A is Hermitian and positive semi-definite. $I_n$ denotes the n×n identity matrix. In some aspects, there may be K≤N single-antenna UEs to simultaneously receive data from the JCAS Tx at the same time/frequency resource block in multi-user mode. Each UE may receive L data samples in a resource block on which the communication channel is assumed to be constant. In this case, the received signal by the k-th UE can be written as $$y_k = h_k \sum_{\ell=1}^{K} w_\ell s_\ell + z_k,$$

where
    $y_k \in \mathbb{C}^{1 \times L}$ is the received signal vector,
    $h_k \in \mathbb{C}^{1 \times N}$ is the channel vector between the JCAS Tx and the k-th UE,
    $w_k$ is the precoder vector designed by the JCAS Tx for the k-th UE,
    $s_k \in \mathbb{C}^{1 \times L}$ are the intended information samples for the k-th UE, and
    $z_k \in \mathbb{C}^{1 \times L}$ are the noise samples at the k-th UE receiver.
In some aspects, $$z_k \sim CN(0, \sigma_k^2 I),$$

where $$\sigma_k^2$$

is the average noise power at the k-th UE receiver. A transmission of independent streams to UEs may be performed with the model:

$$\mathbb{E}[s_k s_\ell^H] = \begin{cases} \dfrac{1}{L}, & \text{if } k = \ell \\ 0, & \text{if } k \neq \ell \end{cases}$$

The term 1/L may be used to have unity power for each block with L samples. After defining augmented matrices, the received signal of all UEs may be represented as: Y=HX+Z=HWS+Z, where the matrices $Y \in \mathbb{C}^{K \times L}$, $H \in \mathbb{C}^{K \times N}$, $W \in \mathbb{C}^{N \times K}$, $S \in \mathbb{C}^{K \times L}$, $Z \in \mathbb{C}^{K \times L}$ are formed by concatenating $y_k, h_k, w_k, s_k, z_k$ for all k in the suitable dimension. For the perfect (ideal) CSI case, it may be assumed that the channel matrix H is perfectly known by the JCAS Tx. In this case, the signal model may be represented as:

$$y_k = h_k \sum_{\ell=1}^{K} w_\ell s_\ell + z_k = \underbrace{h_k w_k s_k}_{desired} + \underbrace{h_k \sum_{\ell \neq k} w_\ell s_\ell}_{interference} + \underbrace{z_k}_{noise}.$$

The signal-to-interference-and-noise ratio (SINR) for each user can be expressed as $$SINR_k = \frac{|h_k w_k|^2}{\mathbb{E}\left[\left|h_k \sum_{\ell \neq k} w_\ell s_\ell + z_k\right|^2\right]} = \frac{|h_k w_k|^2}{\sum_{\ell \neq k}^{K} |h_k w_\ell|^2 + \sigma_k^2}, \forall k.$$

To obtain high SINR values, a commonly used approach is zero-forcing (ZF) precoding which eliminates the multi-user interference by setting $h_k w_\ell = 0$, $\forall k \neq \ell$. To maintain fairness between the users, the condition $h_k w_k = \mu \sigma_k$, $\forall k$ may be used for some non-negative real number $\mu$, resulting in $SINR_k = \mu^2$, $\forall k$. The related conditions can be written in the matrix form as $HW = \mu \Sigma$, where $\Sigma = \text{diag}(\sigma_1, \sigma_2, \ldots, \sigma_K)$. The precoder matrix W may also satisfy the transmit power constraint $\text{tr}(WW^H) = P_t$, where $P_t$ is the total transmit power of the JCAS Tx for the whole resource block with L samples. The ZF solution aims at maximizing UE SINRs (and hence $\mu$) under interference cancellation and transmit power constraints. To find the ZF solution, solve for (P0).

$$\max_{W} \mu \text{ such that } HW = \mu \sum, \ tr(WW^H) = P_t. \tag{P0}$$

The optimal solution of (P0) can be expressed by:

$$W_{ZF} = \frac{\sqrt{P_t}}{\left\|H^\dagger \sum\right\|} H^\dagger \sum.$$

Example proof: all solutions of the linear matrix equation $HW = \mu \Sigma$ can be formulated as $W = \mu H^\dagger \Sigma + H_0 H_1$, where $H_0$ is a matrix whose columns form a basis for null space of H and $H_1$ is an arbitrary matrix with suitable dimensions. It is known that $H_0$ can be found by singular value decomposition and the columns of $H_0$ can be chosen as the right singular vectors of H corresponding to zero singular values. In other words, the singular value decomposition of H can be written as:

$$H = (U_1 \quad U_2) \begin{pmatrix} S_1 & 0_{r \times (N-r)} \\ 0_{(K-r) \times r} & 0_{(K-r) \times (N-r)} \end{pmatrix} \begin{pmatrix} V_1^H \\ V_2^H \end{pmatrix},$$

where r=rank(H) is the number of non-zero singular values, $S_1 \in \mathbb{C}^{r \times r}$ is a diagonal matrix with non-zero singular values on its diagonal, columns of $U_1 \in \mathbb{C}^{K \times r}$, $U_2 \in \mathbb{C}^{K \times (K-r)}$ are left singular vectors, and columns of $V_1 \in \mathbb{C}^{N \times r}$, $V_2 \in \mathbb{C}^{N \times (N-r)}$ are right singular vectors of H.

In this case, $H^\dagger$ and $H_0$ can be expressed as:

$$H^\dagger = V_1 S_1^{-1} U_1^H, H_0 = V_2.$$

As right singular vectors are mutually orthogonal $$(e.g., V_2^H V_1 = 0), H_0^H H^\dagger = 0$$

and:

$$P_c = tr(WW^H) = \left\| \mu H^\dagger \sum + H_0 H_1 \right\|^2 = \mu^2 \left\| H^\dagger \sum \right\|^2 + \left\| H_0 H_1 \right\|^2 \geq \mu^2 \left\| H^\dagger \Sigma \right\|^2$$

Additionally, it follows that:

$$\mu \leq \frac{\sqrt{P_t}}{\left\| H^\dagger \sum \right\|}.$$

The equality holds when:

$$W_{ZF} = \frac{\sqrt{P_t}}{\left\| H^\dagger \sum \right\|} H^\dagger \sum.$$

Therefore, the ZF precoder provides SINR levels:

$$SINR_k = \frac{P_t}{\left\| H^\dagger \sum \right\|^2},$$

The sensing performance depends on the beampattern created by the JCAS Tx. The beampattern for the transmitted signal may be given by:

$$P(\varphi, \theta) = a^H(\phi, \theta) \mathbb{E}[XX^H] a(\varphi, \theta),$$

where:

$$a(\varphi, \theta) = \exp\left( j \frac{2\pi}{\lambda} Bu(\varphi, \theta) \right)$$

is the array steering vector (for both JCAS Tx and sensing Rx antenna arrays), $B \in \mathbb{R}^{N \times 3}$ is the matrix including antenna positions of the Tx/Rx antenna array, and $u(\varphi, \theta) = [\cos \theta \sin \alpha \cos \theta \cos \varphi \sin \theta]^T$ is the unit vector for the azimuth angle $\varphi$ and the elevation angle $\theta$.

Here, an array (such as a uniform linear array (ULA)) with half-wavelength spacing may be placed onto the x-axis and, therefore, the array steering vector can be expressed as $\alpha(\varphi, \theta) = [1 \ e^{j\pi \sin \varphi} \ e^{j2\pi \sin \varphi} \dots e^{j(N-1)\pi \sin \varphi}]^T$, which is only a function of the azimuth angle by the symmetry of ULA in elevation angles.

An optimal sensing precoder $W_0$ can be designed according to the prior information about nearby sensing targets. The procedure includes 4 steps.

Step-1: Determine a sensing beampattern according to the prior information about the targets.

In this step, a related sensing beampattern $P(\varphi, \theta)$ is determined. If there is no prior information about the targets, an omnidirectional pattern can be used where $P(\varphi, \theta) = 1$ for all $\varphi$, $\theta$. If the target angular locations are limited to an interval, a directional beampattern can be aimed where $P(\varphi, \theta) = 1$ for $\varphi \in [\varphi_i, \varphi_{i+1}]$, $\theta \in [\theta_i, \theta_{i+1}]$ for some i and zero elsewhere. Here $[\varphi_i, \varphi_{i+1}]$, $[\theta_i, \theta_{i+1}]$ are the azimuth and elevation intervals for the i-th target, respectively.

Step-2: Determine a desired sensing autocorrelation matrix Rd leading to the desired beampattern.

We solve the problem (P1) in this step:

$$\min_{R_d} \left\| P(\varphi) - a^H(\varphi) R_d a(\varphi) \right\|_p \text{ such that } R_d \geq 0, tr(R_d) = P_t, \quad (P1)$$

where $\|\cdot\|_p$ denotes any valid norm (such as $\ell_2$ norm).

Step-3: Find a feasible sensing autocorrelation matrix for the JCAS transmission.

As the precoder matrix W has dimensions N×K, the equation $WW^H = R_d$ does not have a solution if $rank(R_d) > K$. To find a feasible solution, solve (P2) to find a feasible autocorrelation matrix $R_{d,K}$.

$$\min_{R_{d,K}} \| R_d - R_{d,K} \| \text{ such that } R_{d,K} \geq 0, \quad (P2)$$

$$rank(R_{d,K}) \leq K, tr(R_{d,K}) = tr(R_d).$$

The optimal solution of (P2) is given by:

$$R_{d,K} = \sum_{k=1}^{K} \left( \lambda_k + \frac{1}{K} \sum_{i=K+1}^{N} \lambda_i \right) u_k u_k^H,$$

where $\lambda_1 \geq \lambda_2 \geq \dots \geq \lambda_N$ are the eigenvalues and $u_1, u_2, \dots, u_N$ are the corresponding eigenvectors of $R_d$.

Example Proof: Let the eigenvalues of $R_{d,K}$ be $e_1 \geq e_2 \geq \dots \geq e_K \geq e_{K+1} = e_{K+2} = \dots = e_N = 0$. Using von Neumann's trace inequality:

$$tr(R_d R_{d,K}) \leq \sum_{i=1}^{N} \lambda_i e_i = \sum_{i=1}^{K} \lambda_i e_i.$$

Therefore:

$$\| R_d - R_{d,K} \|^2 =$$

-continued $$tr(R_d^2) + tr(R_{d,K}^2) - 2 \cdot tr(R_d R_{d,K}) \geq \sum_{i=1}^{N} \lambda_i^2 + \sum_{i=1}^{K} e_i^2 - 2\sum_{i=1}^{K} \lambda_i e_i =$$

$$\sum_{i=K+1}^{N} \lambda_i^2 + \sum_{i=1}^{K} (e_i - \lambda_i)^2.$$

Using the Arithmetic Geometric Mean inequality:

$$\sum_{i=1}^{K}(e_i - \lambda_i)^2 \geq \frac{1}{K}\left(\sum_{i=1}^{N}|e_i - \lambda_i|\right)^2 \geq \frac{1}{K}\left(\sum_{i=1}^{N} e_i - \lambda_i\right)^2 = \frac{1}{K}\left(\sum_{i=K+1}^{N} \lambda_i\right)^2,$$

where the last equality is derived from:

$$\sum_{i=1}^{N} \lambda_i = tr(R_d) = tr(R_{d,K}) = \sum_{i=1}^{N} e_i = \sum_{i=1}^{K} e_i.$$

Therefore:

$$\|R_d - R_{d,K}\|^2 \geq \sum_{i=K+1}^{N} \lambda_i^2 + \frac{1}{K}\left(\sum_{i=K+1}^{N} \lambda_i\right)^2.$$

The equality holds when:

$$e_k - \lambda_k = \frac{1}{K}\left(\sum_{i=K+1}^{N} \lambda_i\right), \ \forall k = 1, 2, \ldots, K,$$

and the eigenvectors of $R_{d,K}$ corresponding to $e_1, e_2, \ldots, e_K$ are $u_1, u_2, \ldots, u_K$, respectively.

Step-4: As a final step, determine the optimal sensing precoder by solving (P3).

$$\min_{W} \left\| HW - \frac{\sqrt{P_t}}{\|H^\dagger \sum\|} \sum \right\| \text{ such that } WW^H = R_{d,K}. \tag{P3}$$

The solution of (P3) provides a precoder $W_0$ with a desired sensing beampattern $$\left(W_0 W_0^H = R_{d,\kappa}\right)$$

and the solution is chosen to have a performance close to that of the ZF solution.

The optimal solution of (P3) is given by $W = FUV^H$, where $F \in \mathbb{C}^{N \times \kappa}$ is a matrix satisfying (such a matrix exists as $\text{rank}(R_{d,K}) \leq K \leq N$) $FF^H = R_{d,K}$ and the matrices whose columns are left and right singular vectors of $F^H H^H \Sigma$ are $U$ and $V$, respectively.

Example Proof: Using several algebraic manipulations, we can write:

$$\left\| HW - \frac{\sqrt{P_t}}{\|H^\dagger \sum\|} \sum \right\|^2 =$$

-continued $$tr(HWW^H H^H) + \frac{P_t}{\|H^\dagger \sum\|^2} tr(\sum{}^2) - 2 \cdot \frac{\sqrt{P_t}}{\|H^\dagger \sum\|} \cdot \text{Re}\{tr(\sum HW)\}.$$

As $tr(HWW^H H^H) = tr(HR_{d,K}H^H)$ is fixed, the term $\text{Re}\{tr(\Sigma HW)\}$ may be maximized. By von Neumann's trace inequality:

$$\text{Re}\{tr(\sum HW)\} \leq |tr(\sum HW)| \leq \sum_{i=1}^{K} d_i,$$

where $d_i$s are singular values of the matrix $\Sigma HW$.

We know that the eigenvalues of the matrix $\Sigma HWW^H H^H \Sigma$ are $d_i$s. Hence $\text{Re}\{tr(\Sigma HW)\}$ is upper bounded by the sum of square roots of the eigenvalues of the matrix $\Sigma HWW^H H^H \Sigma = \Sigma HR_{d,K}H^H \Sigma$.

When $W = FUV^H$, $$WW^H = FUV^H VU^H F^H = R_{d,K}.$$

Let the singular value decomposition of $F^H H^H \Sigma$ be $UDV^H$. Then:

$$\sum HW = \sum HFUV^H = VDU^H UV^H = VDV^H.$$

As the singular values of $\Sigma HW$ are $d_i$'s, $D = \text{diag}(d_1, d_2, \ldots, d_K)$.

Finally:

$$tr\left(\sum HW\right) = tr(D) = \sum_{i=1}^{K} d_i,$$

which gives the optimal objective value.

Therefore:

$W_0 = FUV^H$ is the optimal precoding for sensing.

After finding the optimal sensing precoder, the proposed SAZF technique can be used to modify the ZF solution so that an efficient JCAS precoder can be designed.

The resulting JCAS precoder can be found by solving (P4).

$$\min_{W, \mu} \|W - W_0\| \text{ such that } HW = \mu \sum, \mu \geq \mu_0, \tag{P4}$$

$$tr(WW^H) = P_t, \text{ where } \mu_0 = \frac{\sqrt{P_t}}{\|H^\dagger \sum\| \cdot 10^{\frac{c_{dB}}{20}}} \text{ and}$$

$c_{dB}$ is an input parameter that controls how much SINR loss is allowed for each UE compared to that of the ZF solution.

The optimal solution of (P4) is given by:

$$W_{SAZF} = c_1 H^\dagger \sum + c_2 V_2 V_2^H W_0, \mu_{SAZF} = c_1,$$

where
V$_2$ is a matrix whose columns form a basis for null space of H and $$c_1 = \max\left\{a_1 \sqrt{\frac{a_2}{a_1^2 a_3 + a_3^2}}, \ \mu_0\right\}, \ c_2 = \frac{\sqrt{P_t - c_1^2 \left\|H^\dagger \sum\right\|^2}}{\left\|W_0^H V_2\right\|},$$

$$a_1 = \mathrm{Re}\left\{tr\left(W_0^H H^\dagger \sum\right)\right\}, \ a_2 = P_t\left\|W_0^H V_2\right\|^2, \ a_3 = \left\|H^\dagger \sum\right\|^2 \cdot \left\|W_0^H V_2\right\|^2.$$

Example Proof: first consider the problem for a fixed μ. As $$tr\left(WW^H\right) = tr\left(W_0 W_0^H\right) = P_t, \ \mathrm{Re}\left\{tr\left(W_0^H W\right)\right\}$$

may be maximized as:

$$\|W - W_0\|^2 = tr\left(WW^H\right) + tr\left(W_0 W_0^H\right) - 2 \cdot \mathrm{Re}\left\{tr\left(W_0^H W\right)\right\}.$$

All solutions of the linear equation HW=μΣ can be expressed in the form: W=μH$^\dagger$Σ+V$_2$W$_1$, where V$_2$ is a matrix whose columns form a basis for the null space of H and W$_1$ is any matrix with suitable dimensions.

Specifically, V$_2$ can be selected using the singular value decomposition of H:

$$H = (U_1 \ U_2)\begin{pmatrix} S_1 & 0_{r \times (N-r)} \\ 0_{(K-r) \times r} & 0_{(K-r) \times (N-r)} \end{pmatrix}\begin{pmatrix} V_1^H \\ V_2^H \end{pmatrix},$$

where
r=rank(H) (e.g., the number of non-zero singular values),
S$_1$∈$\mathbb{C}^{r \times r}$ is a diagonal matrix with non-zero singular values on its diagonal,
columns of U$_1$∈$\mathbb{C}^{N \times r}$, U$_2$∈$\mathbb{C}^{K \times (K-r)}$ are left singular vectors, and
columns of V$_1$∈$\mathbb{C}^{N \times r}$, V$_2$∈$\mathbb{C}^{N \times (N-r)}$ are right singular vectors of H.
In this case, the pseudoinverse of H can be calculated as:

$$H^\dagger = V_1 S_1^{-1} U_1^H.$$

As right singular vectors are mutually orthogonal, i.e., $$V_2^H V_1 = 0, \ V_2^H H^\dagger = 0.$$

In this case:

$$\mathrm{Re}\left\{tr\left(W_0^H W\right)\right\} =$$

$$\mathrm{Re}\left\{tr\left(W_0^H\left(\mu H^\dagger \sum + V_2 W_1\right)\right)\right\} = \mathrm{Re}\left\{\mu tr\left(W_0^H H^\dagger \sum\right) + tr\left(W_0^H V_2 W_1\right)\right\}.$$

Hence, $$\mathrm{Re}\left\{tr\left(W_0^H V_2 W_1\right)\right\}$$

may be maximized as the term $$\mathrm{Re}\left\{\mu tr\left(W_0^H H^\dagger \Sigma\right)\right\}$$

is fixed. By the transmit power constraint and the fact $$V_2^H H^\dagger = 0:$$

$$P_t = tr\left(WW^H\right) = \left\|\mu H^\dagger \sum + V_2 W_1\right\|^2 = \mu^2\left\|H^\dagger \sum\right\|^2 + \|V_2 W_1\|^2.$$

As $$V_2^H V_2 = 1:$$

$$\|W_1\|^2 + \mu^2\left\|H^\dagger \sum\right\|^2 = P_t.$$

Hence, an equivalent problem becomes:

$$\max_{W_1} \ tr\left(W_0^H V_2 W_1\right) + tr\left(W_1^H V_2^H W_0\right) \text{ such that} \quad \text{(P4.1)}$$

$$\|W_1\|^2 + \mu^2\left\|H^\dagger \sum\right\|^2 = P_t.$$

(P4.1) is a quadratic programming problem with a single quadratic constraint and a linear objective function. It can be shown that strong duality holds for this problem, and hence a Lagrange multipliers method provides the globally optimal solution. The Lagrangian can be written as:

$$\mathcal{L}(W_1) = tr\left(W_0^H V_2 W_1\right) + tr\left(W_1^H V_2^H W_0\right) + \lambda\left(\|W_1\|^2 + \mu^2\left\|H^\dagger \sum\right\|^2 - P_t\right),$$

and when:

$$\nabla \mathcal{L} = V_2^H W_0 + \lambda W_1 = 0,$$

The result is:

$$W_1 = -\frac{1}{\lambda} V_2^H W_0.$$

In this case:

$$W = \mu H^\dagger \sum + V_2 W_1 = \mu H^\dagger \sum - \frac{1}{\lambda} V_2 V_2^H W_0.$$

In other words, the solution of (P4) with c$_1$=μ and c$_2$=1/λ is obtained. By the condition tr(WW$^H$)=P$_t$:

$$\frac{1}{\lambda^2}\left\|V_2^H W_0\right\|^2 + \mu^2\left\|H^\dagger\sum\right\|^2 = P_t$$

yielding:

$$\left|\frac{1}{\lambda}\right| = \frac{\sqrt{P_t - \mu^2\left\|H^\dagger\sum\right\|^2}}{\left\|W_0^H V_2\right\|}.$$

$$W_0^H V_2 \neq 0$$

can be assumed because otherwise, the objective function in (P4.1) becomes zero for any $W_1$ showing that it is not possible to enhance sensing performance and $W_1=0$ can be selected to obtain the standard ZF solution.

To maximize $$\mathrm{Re}\{tr(W_0^H V_2 W_1)\} = -\frac{1}{\lambda}\left\|W_0^H V_2\right\|^2,$$

$\lambda < 0$ and hence:

$$c_2 = -\frac{1}{\lambda}\frac{\sqrt{P_t - c_1^2\left\|H^\dagger\sum\right\|^2}}{\left\|W_0^H V_2\right\|},$$

as desired.

Solving (P4.1) for a fixed $\lambda$ and to find the optimal solution of (P4), the objective function $$\mathrm{Re}\{tr(W_0^H W)\}$$

can be maximized with respect to $\mu$. So, $$\mathrm{Re}\{\mu tr(W_0^H H^\dagger\sum) + tr(W_0^H V_2 W_1)\}$$

can be maximized. Using the fact:

$$tr(W_0^H V_2 W_1) = -\frac{1}{\lambda}\left\|W_0^H V_2\right\|^2 = \left\|W_0^H V_2\right\|\sqrt{P_t - \mu^2\left\|H^\dagger\Sigma\right\|^2}$$

The following is to be solved:

$$\max_\mu \;\mu\mathrm{Re}\{tr(W_0^H H^\dagger\Sigma)\} + \qquad\qquad (P4.2)$$

$$\left\|W_0^H V_2\right\|\sqrt{P_t - \mu^2\left\|H^\dagger\Sigma\right\|^2} \text{ such that } \mu \geq \mu_0.$$

The objective function in (P4.2) can be expressed as $f(\mu) = a_1\mu + \sqrt{a_2 - a_3\mu^2}$ where $a_1$, $a_2$, $a_3$ are defined as given in the optimal solution of (P4). The following is known:

$$\frac{\nabla^2 f(\mu)}{\nabla\mu^2} = -\frac{a_2 a_3}{\left(a_2 - a_3\mu^2\right)^{3/2}} \leq 0,$$

and hence $f(\mu)$ is concave for $$\mu \leq \sqrt{\frac{a_2}{a_3}}.$$

Therefore, the optimal solution of (P4.2) is obtained at $\mu=\max\{\mu_{opt}, \mu_0\}$ where $\mu_{opt}$ is the solution of $$\frac{\nabla f(\mu)}{\nabla\mu} = 0.$$

$\mu_{opt}$ can be obtained by solving:

$$\frac{\nabla f(\mu)}{\nabla\mu} = a_1 - \frac{a_3\mu}{\sqrt{a_2 - a_3\mu^2}} = 0 \text{ as } \mu_{opt} = a_1\sqrt{\frac{a_2}{a_1^2 a_3 + a_3^2}}.$$

Finally, as the optimal solution of (P4.2), the following is obtained:

$$\mu = \max\left\{a_1\sqrt{\frac{a_2}{a_1^2 a_3 + a_3^2}}, \mu_0\right\},$$

as desired. The proof is completed by solutions of (P4.1) and (P4.2).

Using the solution of (P4), a JCAS precoder can be designed as described in Step-5.

Step-5: Design a JCAS precoder using $W_0$ (output of Step-4), the communication channel matrix H, and the input control parameter $c_{dB}$ by solving (P4).

The condition in (P4) $HW=\mu\Sigma$ is a linear equation with NK unknowns (the entries of W) with $K^2$ equations for a fixed $\mu$. Hence, for $K<N$, there are infinitely many solutions with the degrees of freedom $(N-K)K$. The method SAZF tries to use all degrees of freedom to optimize sensing performance by also optimizing $\mu$ under the given communication SINR loss allowance.

Figure 1C:
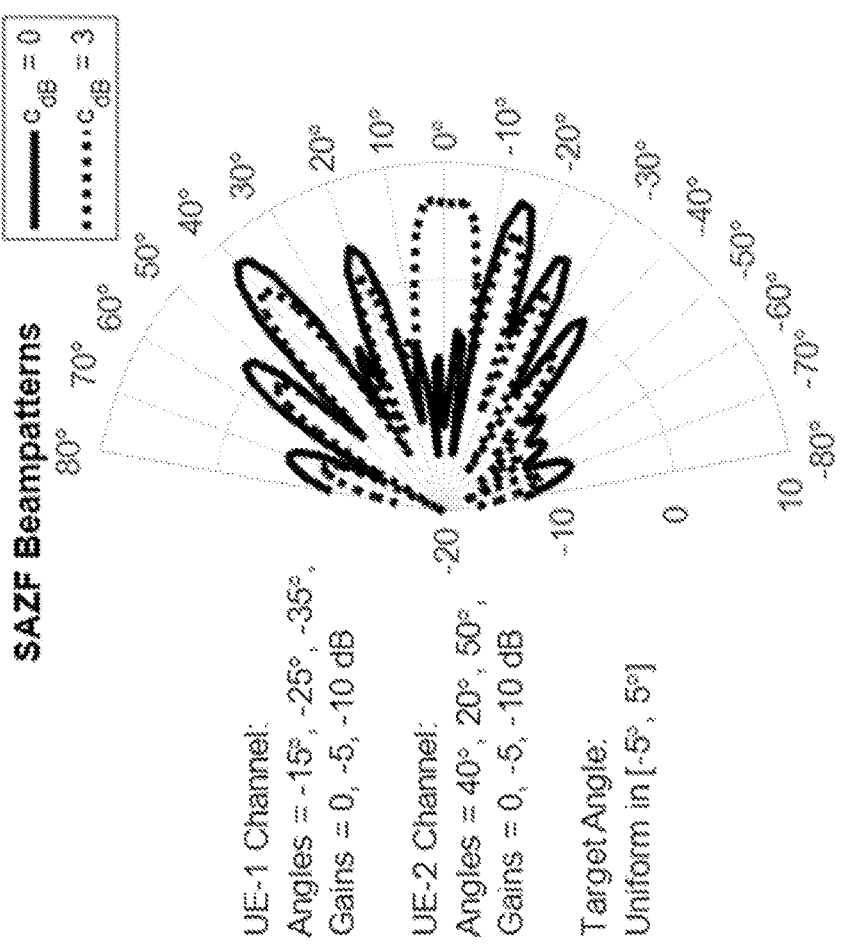

As shown in FIG. 1C and example 110, example beam-patterns are shown for SAZF for $c_{dB}=0$ dB (solid line) and $c_{dB}=3$ dB (dotted line) and for two UEs with 3 dominant angular paths with azimuth angles $\phi=-15°$, $-25°$, $-35°$ for UE 1 and #$=40°$, $20°$, $50°$ for UE 2, and a single target in $[-5°, 5°]$. For both UEs, the normalized channel path gains are 0, $-5$, $-10$ dB, respectively. There is an N=16 element ULA with half-wavelength inter-element spacing at the JCAS Tx.

In some cases, due to thermal noise, inter/intra-cell interference, or hardware impairments, among other examples, the channel coefficients might not be perfectly estimated. Furthermore, if the estimated channel coefficients are fed back to the transmitter, to decrease the feedback overhead, a quantization is applied introducing additional errors. Two channel estimation error types under two cases can be considered:

Type-1 channel estimation error: The error obtained in the channel estimation algorithm due to thermal noise, other

15 | 16 interference signals, and/or hardware impairments. This is modelled as an additive complex Gaussian noise with known second order statistics.

Type-2 channel estimation error: The error obtained due to quantization of the estimated channel coefficients. This is modelled as an additive norm-bounded error where the maximum error amount is determined by the selected quantization points and assumed to be known.

Case 1: Reciprocity-based operation in TDD mode where the downlink channels are estimated via uplink pilot symbols. In this case, only the type-1 channel estimation error is effective.

Case 2: Downlink channel estimation operation in the UE side in TDD or FDD mode where the estimated coefficients are quantized and fed back to the JCAS Tx. In this case, type-1 and type-2 channel estimation errors are effective.

To cover all cases and error types, the channel matrix H is assumed to be known by the JCAS Tx with type-1 and type-2 errors:

$$h_k = \hat{h}_k + \Delta h_k + \Delta q_k,$$

where $\Delta h_k \sim CN(0, \Delta R_{h,k})$ is the type-1 error ($\Delta R_{h,k}$ is the covariance matrix of $\Delta h_k$, e.g., $$\mathbb{E}[\Delta h_k^H \Delta h_k] = \Delta R_{h,k})$$

and $\Delta q_k$ is the type-2 error satisfying $\|\Delta q_k\| \le e_k$ for all k, where $e_k$ is determined by the inter-distances of the quantized channel vectors. This model is suitable for both Case 1 and 2 (in Case 2, $e_k=0, \forall k$). As the transmitter has only the estimated channel information, the signal model can be modified as:

$$y_k = h_k \sum_{\ell=1}^K w_\ell s_\ell + z_k = \underbrace{\hat{h}_k w_k s_k}_{desired} +$$

$$\underbrace{\Delta h_k w_k s_k}_{mismatch,1} + \underbrace{\Delta q_k w_k s_k}_{mismatch,2} + \underbrace{h_k \sum_{\ell \ne k} w_\ell s_\ell}_{interference} + \underbrace{z_k}_{noise}.$$

The SINR for each user can be expressed as:

$$SINR_k = \frac{|\hat{h}_k w_k|^2}{\mathbb{E}[|\Delta h_k w_k s_k + \Delta q_k w_k s_k + h_k \Sigma_{\ell \ne k} w_\ell s_\ell + z_k|^2]}, \forall k,$$

where the expectation is over $\Delta h_k$, $$\{s_\ell\}_{\ell=1}^K, z_k.$$

Due to channel estimation errors, the modified SINR expression has extra terms in the denominator (compared to a perfect CSI case), decreasing the communication performance. Robust algorithms may be used to decrease the effects of the channel estimation errors.

Figure 1D:
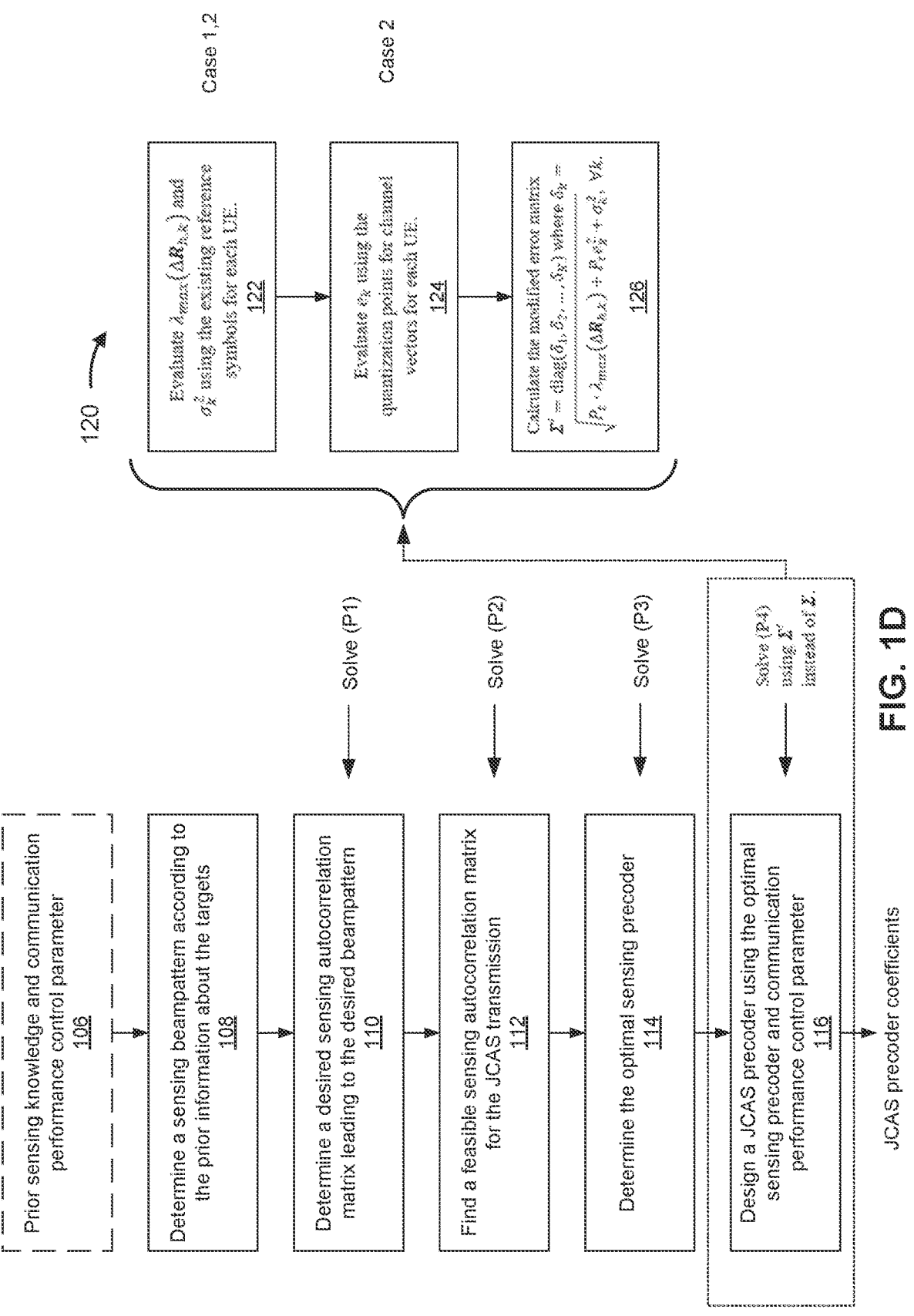

As shown in FIG. 1D and example 120, an SAZF precoder may be designed for imperfect CSI. As shown by reference number 122, a JCAS device may evaluate $\lambda_{max}$ ($\Delta R_{h,k}$) and $$\sigma_k^2$$

using the existing reference symbols for each UE. As shown by reference number 124, the JCAS device may evaluate $e_k$ using the quantization points for channel vectors for each UE. As shown by reference number 126, the JCAS device may calculate a modified error matrix $\Sigma'$. The JCAS device may obtain a modified JCAS precoder by running a robust SAZF algorithm via Step 1-5 by replacing $\Sigma$ with $\Sigma'$ in the solution of (P4) in Step 5. Additional details regarding these features are described below.

In some aspects, to increase the robustness against channel estimation errors, a modification to the SAZF algorithm may be used.

We can calculate the denominator in the modified SINR as:

$$\mathbb{E}\left[\left|\Delta h_k w_k s_k + \Delta q_k w_k s_k + h_k \sum_{\ell \ne k} w_\ell s_\ell + z_k\right|^2\right] =$$
$$\mathbb{E}[|\Delta h_k w_k + \Delta q_k w_k|^2] + \mathbb{E}\left[\left|h_k \sum_{\ell \ne k} w_\ell\right|^2\right] + \sigma_k^2.$$

The first term is equal to:

$$f_1 = \mathbb{E}\left[|\Delta h_k w_k + \Delta q_k w_k|^2\right] = w_k^H \Delta R_{h,k} w_k + \Delta q_k w_k w_k^H \Delta q_k^H.$$

The second term is equal to:

$$f_2 = \mathbb{E}\left[\left|h_k \sum_{\ell \ne k} w_\ell\right|^2\right] = \sum_{\ell \ne k}\left((\hat{h}_k + \Delta q_k) w_\ell w_\ell^H (\hat{h}_k + \Delta q_k)^H + w_\ell^H \Delta R_{h,k} w_\ell\right).$$

Hence:

$$f_1 + f_2 = \sum_{\ell \ne k}(\hat{h}_k + \Delta q_k) w_\ell w_\ell^H (\hat{h}_k + \Delta q_k)^H + \sum_{\ell=1}^K w_\ell^H \Delta R_{h,k} w_\ell + \Delta q_k w_k w_k^H \Delta q_k^H.$$

By Von-Neumann's theorem:

$$w_\ell^H \Delta R_{h,k} w_\ell \le \lambda_{max}(\Delta R_{h,k}) w_\ell^H w_\ell,$$

where $\lambda_{max}(\bullet)$ shows the maximum eigenvalue of the Hermitian and positive semidefinite matrix in its argument. Using the last observation and the transmit power condition:

$$P_t = \sum_{\ell=1}^K w_\ell^H w_\ell,$$

we obtain that:

$$f_1 + f_2 \le \sum_{\ell \ne k}(\hat{h}_k + \Delta q_k) w_\ell w_\ell^H (\hat{h}_k + \Delta q_k)^H + P_t \cdot \lambda_{max}(\Delta R_{h,k}) + \Delta q_k w_k w_k^H \Delta q_k^H.$$

Here, $P_t$ is the total transmit power of the JCAS Tx for the whole resource block with L samples.

Since:

$$\left(\hat{h}_k + \Delta q_k\right) w_\ell w_\ell^H \left(\hat{h}_k + \Delta q_k\right)^H =$$
$$\hat{h}_k w_\ell w_\ell^H \hat{h}_k^H + \Delta q_k w_\ell w_\ell^H \Delta q_k^H + \hat{h}_k w_\ell w_\ell^H \Delta q_k^H + \Delta q_k w_\ell w_\ell^H \hat{h}_k^H,$$

we obtain that:

$$f_1 + f_2 \le$$
$$\Delta q_k R_w \Delta q_k^H + \Delta q_k R_{w,k} \hat{h}_k^H + \hat{h}_k R_{w,k} \Delta q_k^H + \sum_{\ell \ne k} \hat{h}_k w_\ell w_\ell^H \hat{h}_k^H + P_t \cdot \lambda_{max}(\Delta R_{h,k}),$$

where:

$$R_w = \sum_{\ell=1}^K w_\ell w_\ell^H, \quad R_{w,k} = \sum_{\ell \ne k} w_\ell w_\ell^H.$$

Using von-Neumann's inequality once more:

$$\Delta q_k R_w \Delta q_k^H \le \lambda_{max}(R_w) \Delta q_k \Delta q_k^H \le P_t e_k^2,$$

as the trace of the matrix $R_w$ is equal to $P_t$ and the quantization error is norm bounded by $e_k$.

As a result:

$$SINR_k \ge \frac{\left|\hat{h}_k w_k\right|^2}{\sum_{\ell \ne k} \left|\hat{h}_k w_\ell\right|^2 + P_t \cdot \lambda_{max}(\Delta R_{h,k}) + \Delta q_k R_{w,k} \hat{h}_k^H + \hat{h}_k R_{w,k} \Delta q_k^H + P_t e_k^2 + \sigma_k^2}.$$

To obtain high SINR values, a commonly used approach in communication theory is zero forcing (ZF) precoding which eliminates the multi-user interference by setting $\hat{h}_k w_\ell = 0$, $\forall k \ne \ell$. When ZF precoding is used:

$$R_{w,k} \hat{h}_k^H = R_{w,k} = \sum_{\ell \ne k} w_\ell w_\ell^H \hat{h}_k^H = 0.$$

Therefore, the SINR of the k-th UE is lower bounded by:

$$SINR_k \ge \frac{\left|\hat{h}_k w_k\right|^2}{P_t \cdot \lambda_{max}(\Delta R_{h,k}) + P_t e_k^2 + \sigma_k^2}, \quad \forall k.$$

To maintain fairness between the users, the following condition is obtained:

$$\hat{h}_k w_k = \mu \sqrt{P_t \cdot \lambda_{max}(\Delta R_{h,k}) + P_t e_k^2 + \sigma_k^2}, \quad \forall k$$

for some non-negative real number $\mu$ to have $SINR_k \ge \mu^2$, $\forall k$.

In the perfect CSI case, $\Delta R_{h,k} = 0$ and $e_k = 0$ and hence $\hat{h}_k w_k = \mu \sigma_k$, $\forall k$.

The related conditions can be written in the matrix form as:

$$HW = \mu \sum{}',$$

where $\Sigma' = \text{diag}(\delta_1, \delta_2, \ldots, \delta_K)$, where $$\delta_k = \sqrt{P_t \cdot \lambda_{max}(\Delta R_{h,k}) + P_t e_k^2 + \sigma_k^2}, \quad \forall k.$$

The robust version of the SAZF provides the same SINR of all communication UEs and may be beneficial when there are UEs with different levels of channel estimation errors.

Figure 1E:
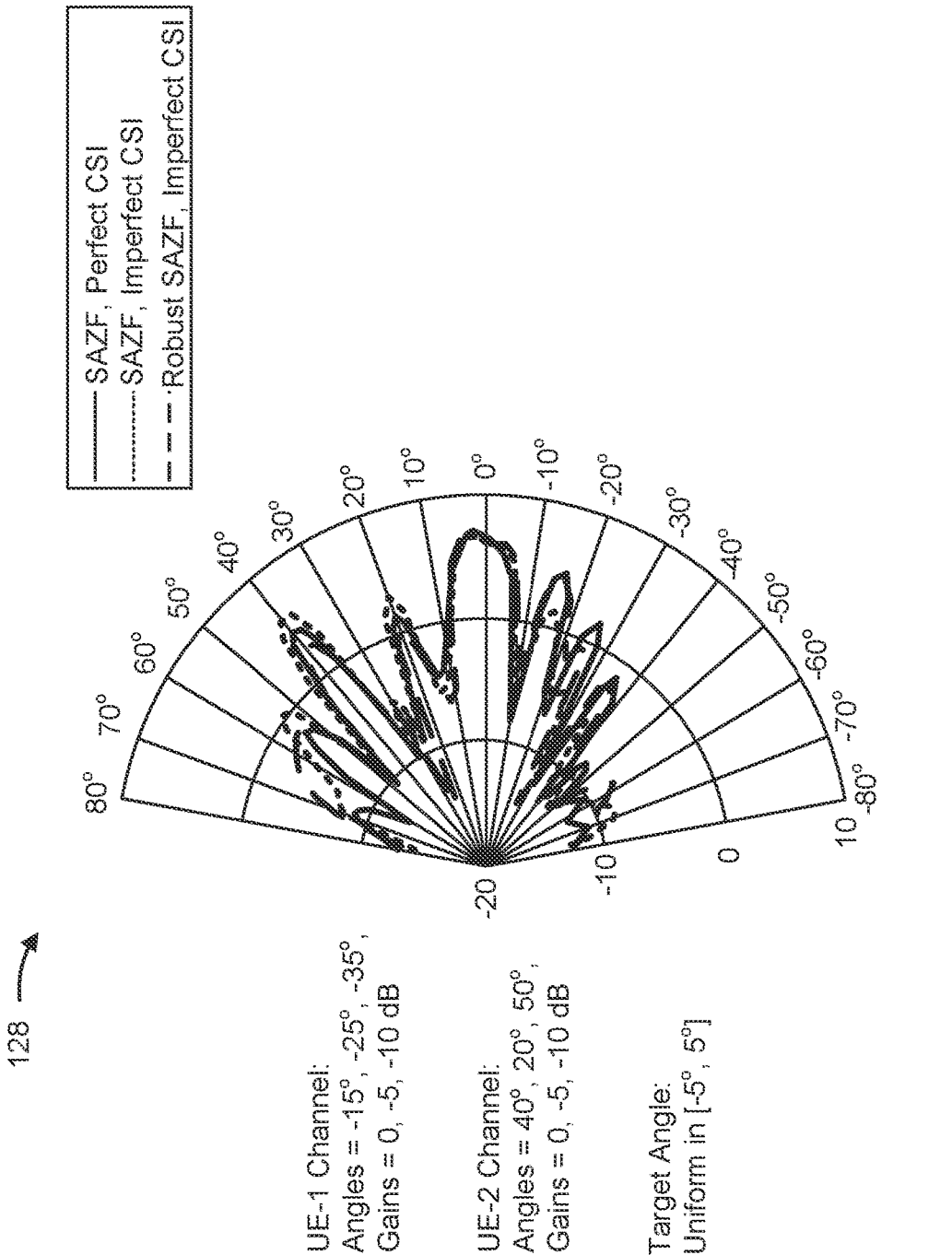

As shown in FIG. 1E and example 128, beampatterns obtained by SAZF and robust SAZF may be compared. In Case 1, there is no channel estimation error and SAZF is used. In Case 2, there are channel estimation errors, but non-robust SAZF is applied as if there is perfect CSI. Case 3 presents the results for robust SAZF when there is no perfect CSI. Two UEs with different channel estimation error levels may be considered. The robust SAZF tries to maintain a similar performance to both UEs and hence the gain values at UE 1 (with larger channel estimation errors) angles are higher in robust SAZF design. On the other hand, for UE 2, the gains are lower. In general, robust SAZF aims at enhancing performance of UEs with larger channel estimation errors while maintaining similar median SINRs for all UEs. SAZF and its robust version with $c_{dB} = 3$ is shown for two UEs with 3 dominant angular paths with azimuth angles $\varphi = -15°, -25°, -35°$ for UE 1 and $\varphi = 40°, 20°, 50°$ for UE 2, and a single target in $[-5°, 5°]$. For both UEs, the normalized channel path gains are $0, -5, -10$ dB, respectively. The channel estimation error for UE 1 is high $$\left(\lambda_{max}(\Delta R_{h,1}) = 1, e_1 = 0.4, \sigma_1^2 = 1\right)$$

and the channel estimation error for UE 2 is low $$\left(\lambda_{max}(\Delta R_{h,2}) = 0.01, e_2 = 0.4, \sigma_2^2 = 1\right),$$

where $P_t = 1$. There is an N=16 element ULA with half-wavelength inter-element spacing at the JCAS Tx.

In some aspects, robust SAZF can provide equal and optimized SINRs under channel estimation errors. To show the level of type-1 and type-2 channel estimation errors, two metrics can be defined as below:

$$SNR_{ch,1,k} = \frac{\hat{h}_k \hat{h}_k^H}{tr(\Delta R_{h,k})}, \quad SNR_{ch,2,k} = \frac{\hat{h}_k \hat{h}_k^H}{e_k^2}, \quad \forall k.$$

Here, $SNR_{ch,1,k}$ shows the ratio of the estimated channel power to type-1 error power, and $SNR_{ch,2,k}$ shows the ratio of the estimated channel power to maximum type-2 error power for the k-th UE. The following may be defined:

$$SNR_k = \frac{P_t}{\sigma_k^2} \hat{h}_k \hat{h}_k^H,$$

which denotes the signal-to-noise ratio (SNR) value of the k-th UE in the case where it is the only UE (no interference), there is no channel estimation error, and the optimal communications precoder (maximal ratio transmission) is applied at the JCAS Tx side:

$$w_k = \sqrt{\frac{P_t}{\hat{h}_k^H \hat{h}_k}} \hat{h}_k^H .$$

In other words, $SNR_k$ is the maximum SNR for the k-th UE for any precoder which can be attained in the ideal single user MIMO case.

We know that the lower bound provided by robust SAZF is the same for all UEs, e.g.:

$$\frac{|\hat{h}_k w_k|^2}{P_t \cdot \lambda_{max}(\Delta R_{h,k}) + P_t e_k^2 + \sigma_k^2} = SINR_0, \forall k.$$

Using the Cauchy-Schwarz inequality:

$$|\hat{h}_k w_k|^2 \leq \hat{h}_k \hat{h}_k^H w_k^H w_k.$$

Using the fact $N \cdot \lambda_{max}(\Delta R_{h,k}) \geq tr(\Delta R_{h,k})$:

$$SINR_0 \leq \frac{\frac{w_k^H w_k}{P_t}}{\frac{1}{N \cdot SNR_{ch,1,k}} + \frac{1}{SNR_{ch,2,k}} + \frac{1}{SNR_k}}, \forall k.$$

Therefore:

$$\left(\frac{1}{N \cdot SNR_{ch,1,k}} + \frac{1}{SNR_{ch,2,k}} + \frac{1}{SNR_k}\right) SINR_0 \leq \frac{w_k^H w_k}{P_t}, \forall k.$$

If the above inequality for all k is summed and $\Sigma_{k=1}^K w_k^H w_k = P_t$ is used:

$$SINR_0 \leq \left[\sum_{k=1}^K \left(\frac{1}{N \cdot SNR_{ch,1,k}} + \frac{1}{SNR_{ch,2,k}} + \frac{1}{SNR_k}\right)\right]^{-1}.$$

The last inequality shows that under channel estimation errors, even if the transmit power is large (resulting in large $SNR_k$ values), the SINR values of the UEs may not be large due to small $SNR_{ch,1,k}$ and/or small $SNR_{ch,2,k}$ values. In one example, assume that $SNR_{ch,1,k} = SNR_{ch,2,k} = 10$ dB for all K=4 UEs for N=16. Let $P_t \to \infty$. In this case, $SINR_0 \leq 3.72$ dB, which is low considering infinite transmission power. When the robust version of SAZF is not used, some UEs may have even lower SINRs.

In some cases, the received signal at the sensing Rx can be represented as follows:

$$Y_s(t) = H_{LoS} X(t - t_{LoS}) e^{j2\pi f_{LoS} t} + \sum_{j=1}^T H_{s,j} X(t - t_{s,j}) e^{j2\pi f_{s,j} t} + Z_s(t),$$

where
$Y_s(t) \in \mathbb{C}^{N \times L}$ is the received signal matrix by the sensing Rx at the time instant t,

20

$H_{LoS} \in \mathbb{C}^{N \times N}$ is the direct path channel matrix between the JCAS Tx and sensing Rx, $H_{s,j} \in \mathbb{C}^{N \times N}$ is the sensing channel matrix for the j-th target including the two-way path-loss and power drop due to radar cross section, $X(t-t_{LoS}) = WS(t-t_{LoS})$ and $X(t-t_{s,j}) = WS(t-t_{s,j})$ are the precoded signal matrices at the time instants $t-t_{LoS}$ and $t-t_{s,j}$, respectively, $f_{LoS}$ and $f_{s,j}$ are doppler frequency shifts for the direct path and the j-th target, respectively, and $Z_s(t), \in \mathbb{C}^{N \times L}$ is the noise matrix related to thermal noise at the sensing Rx at the time instant t.

Here $t_{LoS} = d_{LoS}/c$ shows the time delay for the direct path, T is the total number of targets, and $t_{s,j}$ is the time delay for the j-th target.

The path-loss for reflected signals from targets may be much higher than that of a direct path and hence the estimation of $H_{LoS}$ can be done minimizing the minimum-mean square error. Therefore, an accurate estimate of $H_{LoS}$ can be obtained. JCAS Tx and sensing Rx can perform some information exchange about the transmitted signal X(t). For example, in mono-static cases, they are located near to each other and direct connection is possible. In bi-static cases, the information exchange can be performed via dedicated links such as wired or wireless connections over the core network. As the locations and velocities (in case of mobile nodes) of JCAS Tx and sensing Rx are known by both ends, the initial estimate of the delay $t_{LoS}$ (via $d_{LoS}$) and $f_{LoS}$ can be calculated and fine tuning can be done by cross-correlation of the received samples with the signal X(t).

As shown in FIG. 1F and example 130, a technique is proposed to suppress the direct path between JCAS Tx and sensing Rx. As shown by reference number 132, a JCAS device may find a singular value decomposition of a direct path channel matrix. As shown by reference number 134, the JCAS device may calculate a null-space channel matrix. As shown by reference number 136, the JCAS device may evaluate the eigenvalue decomposition of a transformed sensing autocorrelation matrix. As shown by reference number 138, the JCAS device may calculate a modified feasible sensing autocorrelation matrix. Additional details are described below.

In some aspects, the optimal sensing precoder $W_0$ obtained at the output of Step-4 may be modified so that the Tx beampattern nulls the direct path out. The $H_{LoS}$ matrix may be used as the input. Problem (P2) may be modified as:

$$\min_{R_{d,K}} \|R_d - R_{d,K}\| \quad \begin{array}{ll} \text{such that } R_{d,k} \succeq 0, \quad rank(R_{d,k}) \leq K, \\ tr(R_{d,K}) = tr(R_d), \quad H_{LoS} R_{d,K} H_{LoS}^H = 0. \end{array} \quad (P2.1)$$

The optimal solution to this problem is given by Proposition 1.

Proposition 1: The optimal solution of (P2.1) is given by $$R_{d,K} = \sum_{i=1}^q \left(\lambda_i + \frac{1}{q}\left(tr(R_d) - \sum_{j=1}^q \lambda_j\right)\right) V_2 u_i u_i^H V_2^H,$$

where q=min{N−r, K}, r=rank($H_{LoS}$), $\lambda_1 \geq \lambda_2 \geq \ldots \geq A_{N-r}$ are the eigenvalues of $$V_2^H R_d V_2$$

and
$u_1, u_2, \ldots, u_{N-r}$ are corresponding eigenvectors,
$V_2$ is defined using the singular value decomposition of
$H_{SI}$ as $$H_{SI} = \begin{bmatrix} U_1 & U_2 \end{bmatrix} \begin{bmatrix} \Sigma_1 & 0 \\ 0 & 0 \end{bmatrix} \begin{bmatrix} V_1^H \\ V_2^H \end{bmatrix}$$

where $\Sigma_1 \in \mathbb{R}^{r \times r}$ includes the non-zero singular values in the descending order,
$U_1 \in \mathbb{C}^{N \times r}$ and $U_2 \in \mathbb{C}^{N \times (N-r)}$ include left singular vectors, and
$V_1 \in \mathbb{C}^{N \times r}$ and $V_2 \in \mathbb{C}^{N \times (N-r)}$ include right singular vectors.
Example proof: The proof can be completed via the following steps:
Step 1: Let the eigenvalue decomposition of $R_{d,K}$ be:

$$R_{d,K} = \begin{bmatrix} U_3 & U_4 \end{bmatrix} \begin{bmatrix} \Sigma_2 & 0 \\ 0 & 0 \end{bmatrix} \begin{bmatrix} U_3^H \\ U_4^H \end{bmatrix} = U_3 \Sigma_4 U_3^H$$

where $\Sigma_2 \in \mathbb{R}^{rank(R_{d,K}) \times rank(R_{d,K})}$ includes all non-zero eigenvalues.
The condition $$H_{LoS} R_{d,K} K_{LoS}^H = 0$$

is equivalent to $U_3 = V_2 V_3$ for some $V_3 \in \mathbb{C}^{(N-r) \times rank(R_{d,K})}$.
Step 2: As a result of step 1:

$$R_{d,K} = V_2 V_3 \Sigma_2 V_3^H V_2^H = V_2 R V_2^H$$

where
$R \in \mathbb{C}^{(N-r) \times (N-r)}$ is a matrix satisfying $$R = V_3 \sum\nolimits_2 V_3^H \succcurlyeq 0.$$

As $$V_2^H V_2 = I, \, tr(R_{d,K}) = tr(R).$$

Since all columns of $V_2$ are independent, $rank(R_{d,K}) = rank(R)$.
Step 3: As $R \in \mathbb{C}^{(N-r) \times (N-r)}$, $rank(R) \leq N-r$. Using $rank(R) = rank(R_{d,K}) \leq K$, $rank(R) \leq \min\{N-r, K\} = q$. Let the eigenvalues of $R$ be $e_1 \geq e_2 \geq \ldots \geq e_q \geq e_{q+1} = e_{q+2} = \ldots = e_{N-r} = 0$. Using von Neumann's inequality:

$$tr(V_2^H R_d V_2 R) \leq \sum_{i=1}^{N-r} \lambda_i e_i = \sum_{i=1}^{q} \lambda_i e_i.$$

Therefore:

$$\|R_d - R_{d,K}\|^2 = tr(R_d^2) + tr(R_{d,K}^2) - 2 \cdot tr(R_d R_{d,K})$$

-continued
$$= tr(R_d^2) + tr(V_2 R V_2^H V_2 R V_2^H) - 2 \cdot tr(R_d V_2 R V_2^H)$$
$$= tr(R_d^2) + tr(R^2) - 2 \cdot tr(V_2^H R_d V_2 R)$$
$$\geq tr(R_d^2) + \sum_{i=1}^{q} e_i^2 - 2 \sum_{i=1}^{q} \lambda_i e_i$$
$$= tr(R_d^2) - \sum_{i=1}^{q} \lambda_i^2 + \sum_{i=1}^{q} (e_i - \lambda_i)^2.$$

Using the Arithmetic-Geometric Mean inequality:

$$\sum_{i=1}^{q} (e_i - \lambda_i)^2 \geq \frac{1}{q} \left( \sum_{i=1}^{q} |e_i - \lambda_i| \right)^2 \geq \frac{1}{q} \left( \sum_{i=1}^{q} e_i - \lambda_i \right)^2 = \frac{1}{q} \left( tr(R_d) - \sum_{i=1}^{q} \lambda_i \right)^2,$$

where the last equality is obtained from:

$$\sum_{i=1}^{q} e_i = tr(R) = tr(R_{d,K}) = tr(R_d).$$

Hence:

$$\|R_d - R_{d,K}\|^2 \geq tr(R_d^2) - \sum_{i=1}^{q} \lambda_i^2 + \frac{1}{q} \left( tr(R_d) - \sum_{i=1}^{q} \lambda_i \right)^2.$$

The equality holds when:

$$e_i - \lambda_i = \frac{1}{q} \left( tr(R_d) - \sum_{j=1}^{q} \lambda_j \right), \, \forall \, i = 1, \ldots, q$$

and eigenvectors of $R$ are $u_1, u_2, \ldots, u_{N-r}$ yielding:

$$R_{d,K} = \sum_{i=1}^{q} \left( \lambda_i + \frac{1}{q} \left( tr(R_d) - \sum_{j=1}^{q} \lambda_j \right) \right) V_2 u_i u_i^H V_2^H.$$

Solution of (P2.1) provides cancellation of the direct path when the beampattern is formed using the autocorrelation matrix $R_{d,K}$. Hence, if the modified optimal sensing precoder $W_0$ is generated following Steps 1-4 where (P2.1) is solved instead of P2 in Step-3, then the direct path can be cancelled.

Figure 1G:
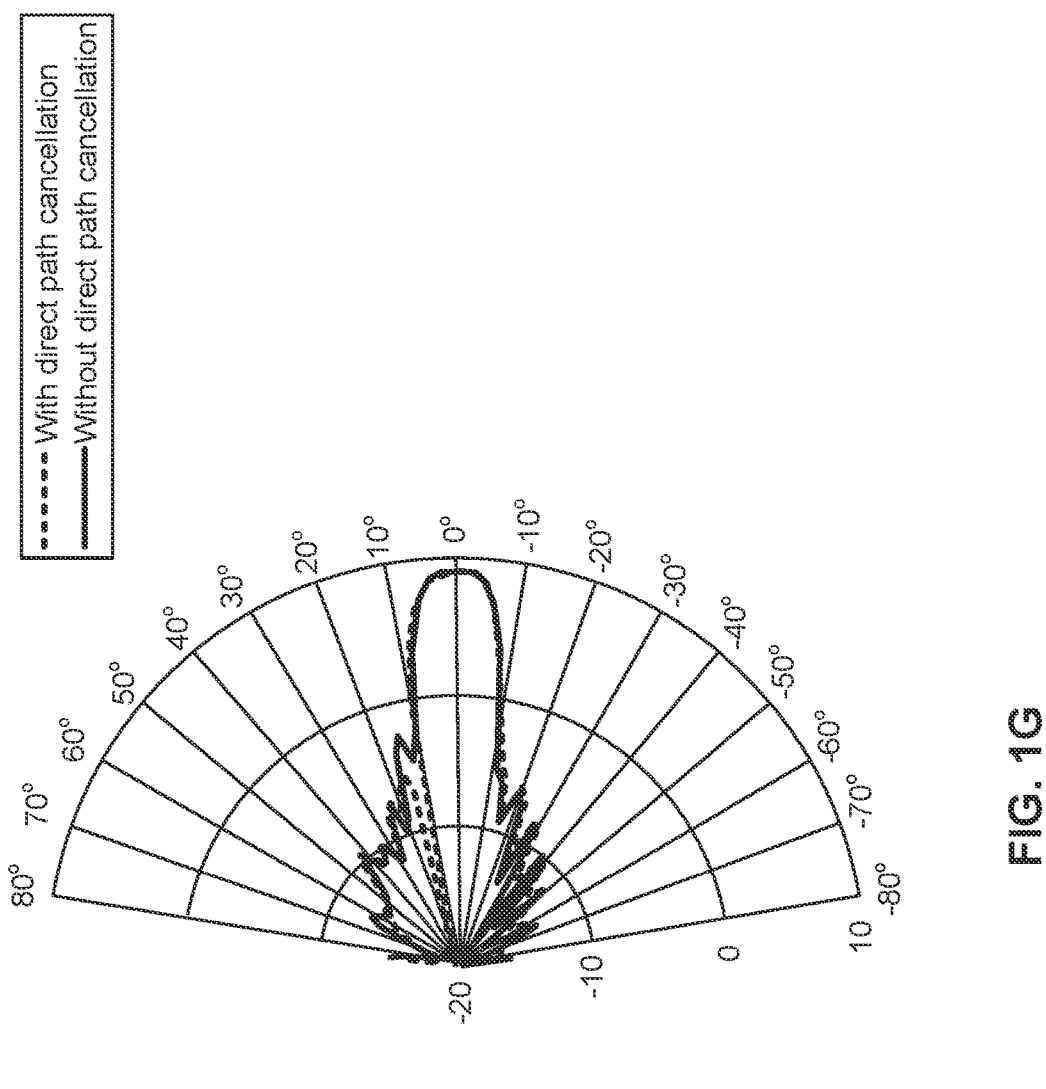

An example sensing beampattern with and without direct path cancellation is shown in FIG. 1G and example 140. Here, there is a uniform linear array with N=16 antennas at the JCAS Tx, the target is inside [−5°, 5° ] and $\varphi_{LoS} = 12°$. When the direct path cancellation is active, the beampattern has a null at the desired azimuth angle $\varphi_{LoS}$ at the direction of sensing Rx. In this example, the direct path is line-of-sight with a single dominant angle. In general, the direct path between JCAS Tx and sensing Rx can have multiple dominant directions with some non-line-of-sight components. As long as $H_{LoS}$ is accurately estimated, the corresponding direct path signal can be cancelled.

Figure 1H:
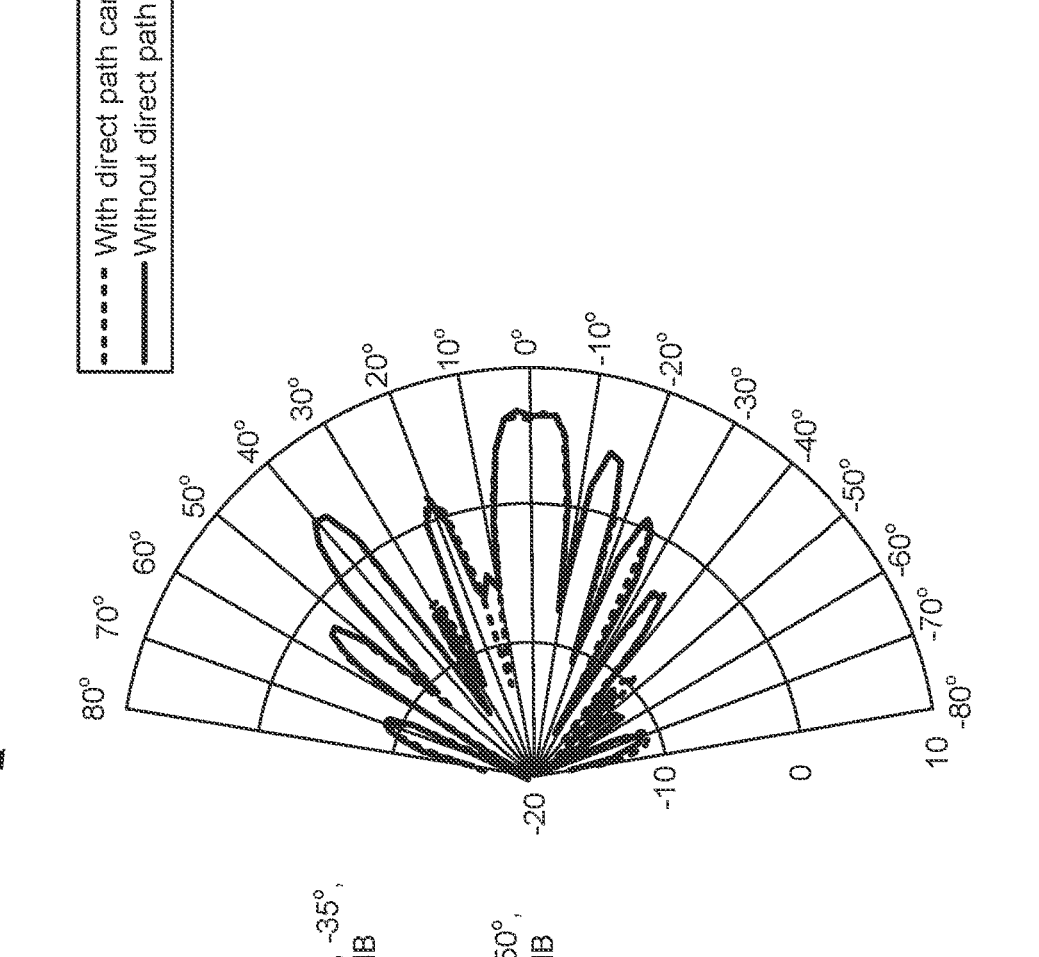

A beampattern obtained by the solution of SAZF with direct path cancellation is shown in FIG. 1H and example 142. The beampattern for the JCAS precoder is nearly the same except the gain at direct path angle. The direct path signal suppression is about 8 dB in this example. A significant direct path suppression can be obtained without changing the communication and sensing performances. The resulting beampatterns are shown for SAZF with $c_{dB}=3$ for two UEs with 3 dominant angular paths with azimuth angles $\varphi=-15°$, $-25°$, $-35°$ for UE 1 and $\varphi=40°$, $20°$, $50°$ for UE 2, and a single target in $[-5°, 5°]$. For both UEs, the normalized channel path gains are 0, $-5$, $-10$ dB, respectively. There is an N=16 element ULA with half-wavelength inter-element spacing at the JCAS Tx and $\varphi_{LoS}=12°$.

As indicated above, FIGS. 1A-1H are provided as examples. Other examples may differ from what is described with regard to FIGS. 1A-1H.

Figure 2:
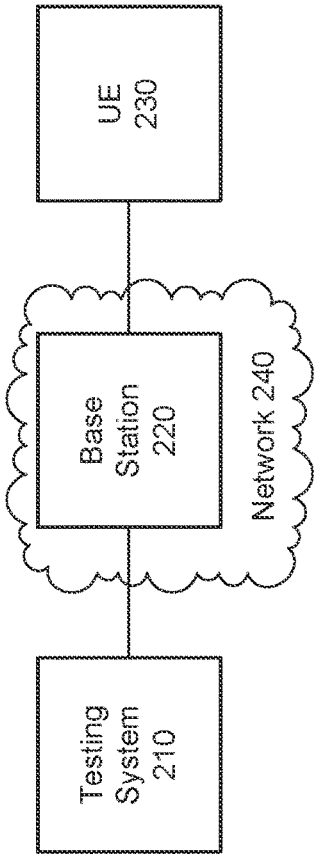
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a testing system 210, a base station 220, a UE 230, and a network 240. Devices of environment 200 may interconnect via wired connections, wireless connections, or a combination of wired and wireless connections.

Testing system 210 includes one or more devices capable of communicating with base station 220 and/or a network (e.g., network 240), such as to perform processing of a signal produced by base station 220. Testing system 210 may communicate with base station 220 by a wired connection, as described elsewhere herein. In some implementations, testing system 210 may wirelessly communicate with base station 220.

Testing system 210 may include a beamforming network, a feedback component, and/or a test component as described elsewhere herein. The beamforming network may include an analog beamforming network that outputs a signal associated with a beam direction, as described elsewhere herein. The feedback component may include a passive radio frequency (RF) component, such as an RF coupler, that outputs a feedback signal based on an output signal of the beamforming network or a calibration signal of a calibration component of the base station 220, as described elsewhere herein. The test component may include one or more devices capable of receiving, generating, storing, processing, and/or providing information associated with a signal, such as an RF signal (e.g., an output signal of the beamforming network). For example, the test component may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Base station 220 includes one or more devices capable of communicating with a UE using a cellular radio access technology (RAT). For example, base station 220 may include a base transceiver station, a radio base station, a node B, an evolved node B (eNB), a gNB, a base station subsystem, a cellular site, a cellular tower (e.g., a cell phone tower or a mobile phone tower), an access point, a transmit receive point (TRP), a radio access node, a macro-cell base station, a microcell base station, a picocell base station, a femtocell base station, or a similar type of device. Base station 220 may transfer traffic between a UE (e.g., using a cellular RAT), other base stations 220 (e.g., using a wireless interface or a backhaul interface, such as a wired backhaul interface), and/or network 240. Base station 220 may provide one or more cells that cover geographic areas. Some base stations 220 may be mobile base stations. Some base stations 220 may be capable of communicating using multiple RATs.

In some implementations, base station 220 may perform scheduling and/or resource management for UEs covered by base station 220 (e.g., UEs covered by a cell provided by base station 220). In some implementations, base stations 220 may be controlled or coordinated by a network controller, which may perform load balancing and/or network-level configuration. The network controller may communicate with base stations 220 via a wireless or wireline backhaul. In some implementations, base station 220 may include a network controller, a self-organizing network (SON) module or component, or a similar module or component. In other words, a base station 220 may perform network control, scheduling, and/or network management functions (e.g., for other base stations 220 and/or for uplink, downlink, and/or sidelink communications of UEs covered by the base station 220). In some implementations, base station 220 may include a central unit and multiple distributed units. The central unit may coordinate access control and communication with regard to the multiple distributed units. The multiple distributed units may provide UEs and/or other base stations 220 with access to network 240.

In some implementations, base station 220 may be capable of MIMO communication (e.g., beamformed communication). In some implementations, base station 220 may include a calibration component for phase calibration of signals produced or received by base station 220, as described elsewhere herein. In a testing scenario, one or more antenna elements (e.g., an antenna array) of base station 220 may be disconnected, and base station 220 may be connected to a test panel, as described elsewhere herein.

UE 230 may include one or more devices capable of communicating with base station 220 and/or a network (e.g., network 240). For example, UE 230 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, user equipment, and/or a similar device. UE 230 may be capable of communicating using uplink (e.g., UE to base station) communications, downlink (e.g., base station to UE) communications, and/or sidelink (e.g., UE-to-UE) communications. In some implementations, UE 230 may include a machine-type communication (MTC) UE, such as an evolved or enhanced MTC (eMTC) UE. In some implementations, UE 230 may include an Internet of Things (IoT) UE, such as a narrowband IoT (NB-IoT) UE.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of next generation network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
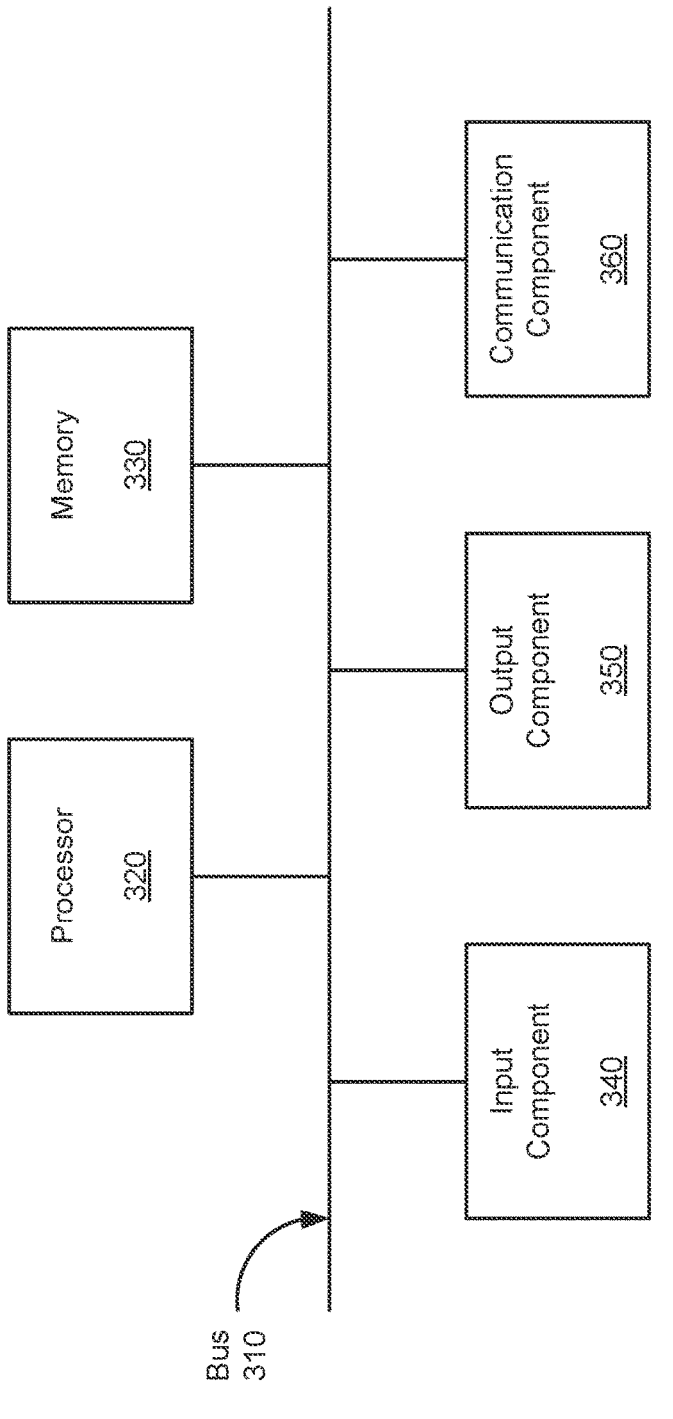
FIG. 3 is a diagram of example components of a device associated with precoders for joint communication and sensing.

FIG. 3 is a diagram of example components of a device 300 associated with precoders for joint communication and sensing. The device 300 may correspond to the testing system 210, the base station 220, and/or the UE 230. In some implementations, the testing system 210, the base station 220, and/or the UE 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with precoders for joint communication and sensing. In some implementations, one or more process blocks of FIG. 4 may be performed by one or more components of device 300, such as processor 320, memory 330, input component 340, output component 350, and/or communication component 360.

As shown in FIG. 4, process 400 may include obtaining information associated with one or more targets, wherein the information associated with the one or more targets includes sensing information and a communication performance control parameter (block 410). For example, the device may obtain information associated with one or more targets, wherein the information associated with the one or more targets includes sensing information and a communication performance control parameter, as described above.

As further shown in FIG. 4, process 400 may include determining a sensing beampattern based at least in part on the information associated with the one or more targets (block 420). For example, the device may determine a sensing beampattern based at least in part on the information associated with the one or more targets, as described above.

As further shown in FIG. 4, process 400 may include determining a target sensing autocorrelation matrix for the sensing beampattern (block 430). For example, the device may determine a target sensing autocorrelation matrix for the sensing beampattern, as described above.

As further shown in FIG. 4, process 400 may include identifying a candidate sensing autocorrelation matrix for a joint communication and sensing transmission based at least in part on the target sensing autocorrelation matrix (block 440). For example, the device may identify a candidate sensing autocorrelation matrix for a joint communication and sensing transmission based at least in part on the target sensing autocorrelation matrix, as described above.

As further shown in FIG. 4, process 400 may include determining a target sensing precoder based at least in part on the candidate sensing autocorrelation matrix (block 450).

For example, the device may determine a target sensing precoder based at least in part on the candidate sensing autocorrelation matrix, as described above.

As further shown in FIG. 4, process 400 may include generating a joint communication and sensing precoder based at least in part on the target sensing precoder and the communication performance control parameter (block 460). For example, the device may generate a joint communication and sensing precoder based at least in part on the target sensing precoder and the communication performance control parameter, as described above.

Process 400 may include additional implementations, such as any single implementation or any combination of implementations described below and/or in connection with one or more other processes described elsewhere herein.

In a first implementation, process 400 includes generating a plurality of joint communication and sensing precoder coefficients using the joint communication and sensing precoder.

In a second implementation, alone or in combination with the first implementation, generating the plurality of joint communication and sensing precoder coefficients comprises generating the plurality of joint communication and sensing precoder coefficients for a mono-static joint communication and sensing system.

In a third implementation, alone or in combination with one or more of the first and second implementations, generating the plurality of joint communication and sensing precoder coefficients comprises generating the plurality of joint communication and sensing precoder coefficients for a bi-static joint communication and sensing system.

In a fourth implementation, alone or in combination with one or more of the first through third implementations, process 400 includes evaluating, using one or more reference symbols for each UE of a plurality of UEs, a first parameter associated with a Type-1 channel estimation error, wherein the first parameter is based at least in part on a maximum eigenvalue of a covariance matrix for the Type-1 channel estimation error, evaluating, using one or more channel vectors for each UE of the plurality of UEs, a second parameter associated with a Type-2 channel estimation error, wherein the second parameter is based at least in part on a maximum error norm value for the Type-2 channel estimation error, and calculating a modified error matrix based at least in part on the first parameter and the second parameter.

In a fifth implementation, alone or in combination with one or more of the first through fourth implementations, process 400 includes generating a modified joint communication and sensing precoder based at least in part on the modified error matrix, the target sensing precoder, and the communication performance control parameter.

In a sixth implementation, alone or in combination with one or more of the first through fifth implementations, process 400 includes identifying a singular value decomposition of a direct path channel matrix, calculating a null-space matrix based at least in part on the singular value decomposition of the direct path channel matrix, evaluating an eigenvalue decomposition of a transformed sensing autocorrelation matrix, and calculating a modified candidate sensing autocorrelation matrix based at least in part on the eigenvalue decomposition of the transformed sensing autocorrelation matrix.

In a seventh implementation, alone or in combination with one or more of the first through sixth implementations, determining the target sensing precoder based at least in part on the candidate sensing autocorrelation matrix comprises determining the target sensing precoder based at least in part on the modified candidate sensing autocorrelation matrix, wherein the joint communication and sensing precoder is based at least in part on the target sensing precoder.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
obtaining information associated with one or more targets, wherein the information associated with the one or more targets includes sensing information and a communication performance control parameter;
determining a sensing beampattern based at least in part on the information associated with the one or more targets;
determining a target sensing autocorrelation matrix for the sensing beampattern;
identifying a candidate sensing autocorrelation matrix for a joint communication and sensing transmission based at least in part on the target sensing autocorrelation matrix;
determining a target sensing precoder based at least in part on the candidate sensing autocorrelation matrix; and
generating a joint communication and sensing precoder based at least in part on the target sensing precoder and the communication performance control parameter.

2. The method of claim 1, further comprising generating a plurality of joint communication and sensing precoder coefficients using the joint communication and sensing precoder.

3. The method of claim 2, wherein generating the plurality of joint communication and sensing precoder coefficients comprises generating the plurality of joint communication and sensing precoder coefficients for a mono-static joint communication and sensing system.

4. The method of claim 2, wherein generating the plurality of joint communication and sensing precoder coefficients comprises generating the plurality of joint communication and sensing precoder coefficients for a bi-static joint communication and sensing system.

5. The method of claim 1, further comprising:
evaluating, using one or more reference symbols for each user equipment (UE) of a plurality of UEs, a first parameter associated with a Type-1 channel estimation error, wherein the first parameter is based at least in part on a maximum eigenvalue of a covariance matrix for the Type-1 channel estimation error;

evaluating, using one or more channel vectors for each UE of the plurality of UEs, a second parameter associated with a Type-2 channel estimation error, wherein the second parameter is based at least in part on a maximum error norm value for the Type-2 channel estimation error; and
calculating a modified error matrix based at least in part on the first parameter and the second parameter.

6. The method of claim 5, further comprising generating a modified joint communication and sensing precoder based at least in part on the modified error matrix, the target sensing precoder, and the communication performance control parameter.

7. The method of claim 1, further comprising:
identifying a singular value decomposition of a direct path channel matrix;
calculating a null-space matrix based at least in part on the singular value decomposition of the direct path channel matrix;
evaluating an eigenvalue decomposition of a transformed sensing autocorrelation matrix; and
calculating a modified candidate sensing autocorrelation matrix based at least in part on the eigenvalue decomposition of the transformed sensing autocorrelation matrix.

8. The method of claim 7, wherein determining the target sensing precoder based at least in part on the candidate sensing autocorrelation matrix comprises determining the target sensing precoder based at least in part on the modified candidate sensing autocorrelation matrix, wherein the joint communication and sensing precoder is based at least in part on the target sensing precoder.

9. A device, comprising:
one or more processors configured to:
obtain information associated with one or more targets, wherein the information associated with the one or more targets includes sensing information and a communication performance control parameter;
determine a sensing beampattern based at least in part on the information associated with the one or more targets;
determine a target sensing autocorrelation matrix for the sensing beampattern;
identify a candidate sensing autocorrelation matrix for a joint communication and sensing transmission based at least in part on the target sensing autocorrelation matrix;
determine a target sensing precoder based at least in part on the candidate sensing autocorrelation matrix; and
generate a joint communication and sensing precoder based at least in part on the target sensing precoder and the communication performance control parameter.

10. The device of claim 9, wherein the one or more processors are configured to generate a plurality of joint communication and sensing precoder coefficients using the joint communication and sensing precoder.

11. The device of claim 9, wherein the one or more processors are configured to:
evaluate, using one or more reference symbols for each user equipment (UE) of a plurality of UEs, a first parameter associated with a Type-1 channel estimation error, wherein the first parameter is based at least in part on a maximum eigenvalue of a covariance matrix for the Type-1 channel estimation error;

evaluate, using one or more channel vectors for each UE of the plurality of UEs, a second parameter associated with a Type-2 channel estimation error, wherein the second parameter is based at least in part on a maximum error norm value for the Type-2 channel estimation error; and calculate a modified error matrix based at least in part on the first parameter and the second parameter.

12. The device of claim 11, wherein the one or more processors are configured to generate a modified joint communication and sensing precoder based at least in part on the modified error matrix, the target sensing precoder, and the communication performance control parameter.

13. The device of claim 9, wherein the one or more processors are configured to:

identify a singular value decomposition of a direct path channel matrix;

calculate a null-space matrix based at least in part on the singular value decomposition of the direct path channel matrix;

evaluate an eigenvalue decomposition of a transformed sensing autocorrelation matrix; and calculate a modified candidate sensing autocorrelation matrix based at least in part on the eigenvalue decomposition of the transformed sensing autocorrelation matrix.

14. The device of claim 13, wherein the one or more processors, to determine the target sensing precoder based at least in part on the candidate sensing autocorrelation matrix, are configured to determine the target sensing precoder based at least in part on the modified candidate sensing autocorrelation matrix, wherein the joint communication and sensing precoder is based at least in part on the target sensing precoder.

15. A non-transitory computer-readable medium storing a set of instructions, the set of instructions comprising:

one or more instructions that, when executed by one or more processors of a device, cause the device to:

obtain information associated with one or more targets, wherein the information associated with the one or more targets includes sensing information and a communication performance control parameter;

determine a sensing beampattern based at least in part on the information associated with the one or more targets;

determine a target sensing autocorrelation matrix for the sensing beampattern;

identify a candidate sensing autocorrelation matrix for a joint communication and sensing transmission based at least in part on the target sensing autocorrelation matrix;

determine a target sensing precoder based at least in part on the candidate sensing autocorrelation matrix; and generate a joint communication and sensing precoder based at least in part on the target sensing precoder and the communication performance control parameter.

16. The non-transitory computer-readable medium of claim 15, wherein the one or more instructions further cause the device to generate a plurality of joint communication and sensing precoder coefficients using the joint communication and sensing precoder.

17. The non-transitory computer-readable medium of claim 15, wherein the one or more instructions further cause the device to:

evaluate, using one or more reference symbols for each user equipment (UE) of a plurality of UEs, a first parameter associated with a Type-1 channel estimation error, wherein the first parameter is based at least in part on a maximum eigenvalue of a covariance matrix for the Type-1 channel estimation error;

evaluate, using one or more channel vectors for each UE of the plurality of UEs, a second parameter associated with a Type-2 channel estimation error, wherein the second parameter is based at least in part on a maximum error norm value for the Type-2 channel estimation error; and calculate a modified error matrix based at least in part on the first parameter and the second parameter.

18. The non-transitory computer-readable medium of claim 17, wherein the one or more instructions further cause the device to generate a modified joint communication and sensing precoder based at least in part on the modified error matrix, the target sensing precoder, and the communication performance control parameter.

19. The non-transitory computer-readable medium of claim 15, wherein the one or more instructions further cause the device to:

identify a singular value decomposition of a direct path channel matrix;

calculate a null-space matrix based at least in part on the singular value decomposition of the direct path channel matrix;

evaluate an eigenvalue decomposition of a transformed sensing autocorrelation matrix; and calculate a modified candidate sensing autocorrelation matrix based at least in part on the eigenvalue decomposition of the transformed sensing autocorrelation matrix.

20. The non-transitory computer-readable medium of claim 19, wherein determining the target sensing precoder based at least in part on the candidate sensing autocorrelation matrix comprises determining the target sensing precoder based at least in part on the modified candidate sensing autocorrelation matrix, wherein the joint communication and sensing precoder is based at least in part on the target sensing precoder.

* * * * *